(12) United States Patent
Altekruse et al.

(10) Patent No.: US 12,394,950 B2
(45) Date of Patent: *Aug. 19, 2025

(54) RECONFIGURABLE WELDING-TYPE POWER SOCKETS AND POWER PLUGS

(71) Applicant: ILLINOIS TOOL WORKS INC., Glenview, IL (US)

(72) Inventors: Kenneth C. Altekruse, Appleton, WI (US); Brian L. Ott, Sherwood, WI (US)

(73) Assignee: ILLINOS TOOL WORKS INC., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,701

(22) Filed: Jan. 22, 2024

(65) Prior Publication Data
US 2024/0162671 A1 May 16, 2024

Related U.S. Application Data

(63) Continuation of application No. 16/033,922, filed on Jul. 12, 2018, now Pat. No. 11,894,642.

(51) Int. Cl.
| | | |
|---|---|---|
| *H01R 27/00* | (2006.01) | |
| *B23K 9/10* | (2006.01) | |
| *H01R 13/207* | (2006.01) | |
| *H01R 31/06* | (2006.01) | |

(52) U.S. Cl.
CPC .......... *H01R 27/00* (2013.01); *B23K 9/1006* (2013.01); *H01R 13/207* (2013.01); *H01R 31/06* (2013.01)

(58) Field of Classification Search
CPC .... H01R 27/00; H01R 13/207; H01R 13/645; H01R 13/642; H01R 31/06; H01R 4/56; B23K 9/1006; B23K 9/32

USPC ....................................................... 219/130.1
See application file for complete search history.

(56) References Cited

U.S. PATENT DOCUMENTS

| | | | | | |
|---|---|---|---|---|---|
| 1,712,108 | A | * | 5/1929 | Goeller | H01R 4/5025 |
| | | | | | 411/176 |
| 2,702,894 | A | * | 2/1955 | Mitchell | H01R 24/58 |
| | | | | | 439/671 |
| 3,071,751 | A | * | 1/1963 | Horndasch | H01R 4/56 |
| | | | | | 439/429 |
| 3,109,691 | A | * | 11/1963 | Burkhardt | H01T 13/05 |
| | | | | | 439/429 |

(Continued)

FOREIGN PATENT DOCUMENTS

WO        2013112514        8/2013

OTHER PUBLICATIONS

International Searching Authority, "Search Report and Written Opinion," issued in connection with International Patent Application No. PCT/US2019/037315, mailed Oct. 18, 2019, 17 pages.

(Continued)

*Primary Examiner* — Eric S Stapleton
(74) *Attorney, Agent, or Firm* — McAndrews, Held & Malloy, Ltd.

(57) ABSTRACT

In some examples, apparatuses, systems, and/or methods for configuring and/or reconfiguring welding-type power sockets and/or welding-type plugs may include welding-type power sockets and/or welding-type plugs that may be configurable (and/or reconfigurable) through custom socket inserts, socket connectors, plug adapters, and plug receptacles.

20 Claims, 27 Drawing Sheets

(56) References Cited

U.S. PATENT DOCUMENTS

| | | | | |
|---|---|---|---|---|
| 3,391,262 A * | 7/1968 | Twitchell, Jr. | H01R 27/00 | 200/51.09 |
| 3,401,749 A * | 9/1968 | Daniel | E21B 33/072 | 405/184 |
| 3,456,412 A * | 7/1969 | Decombas | E04D 3/3605 | 52/549 |
| 3,629,547 A * | 12/1971 | Kester | B23K 9/295 | 219/136 |
| 3,724,965 A * | 4/1973 | Green | B23B 29/0341 | 408/183 |
| 3,757,616 A * | 9/1973 | Raccio | B23B 29/10 | 82/158 |
| 3,771,099 A * | 11/1973 | Dinse | B23K 9/323 | 439/191 |
| 3,798,586 A * | 3/1974 | Huska | H01R 13/193 | 403/361 |
| 3,813,635 A * | 5/1974 | Cooper, Jr | H01R 4/56 | 439/724 |
| 3,825,875 A * | 7/1974 | Garrett | H01R 27/00 | 439/103 |
| 3,847,287 A * | 11/1974 | Dinse | B23K 9/133 | 219/136 |
| 3,851,296 A * | 11/1974 | Muchmore | H02G 15/10 | 439/879 |
| 3,903,745 A * | 9/1975 | Bolser | G01N 1/2258 | 73/431 |
| 3,936,132 A * | 2/1976 | Hutter | H01R 24/40 | 439/736 |
| 4,033,374 A * | 7/1977 | Danon | F16K 21/14 | 137/461 |
| 4,049,943 A * | 9/1977 | Pratt | B23K 9/323 | 219/136 |
| 4,104,521 A * | 8/1978 | Herrmann, Jr. | H01T 19/00 | 250/493.1 |
| 4,123,132 A * | 10/1978 | Hardy | F16B 39/24 | 439/709 |
| 4,161,622 A * | 7/1979 | Drayer | H05B 3/06 | 174/152 R |
| 4,210,796 A * | 7/1980 | Moerke | B23K 9/323 | 219/137.9 |
| 4,237,946 A * | 12/1980 | Leitner | B25B 23/10 | 81/429 |
| 4,261,146 A * | 4/1981 | Holmes | B63B 3/56 | 52/393 |
| 4,270,824 A * | 6/1981 | Erickson | B23K 9/323 | 439/784 |
| 4,278,312 A * | 7/1981 | Buffa | H01R 13/213 | 439/933 |
| 4,297,561 A * | 10/1981 | Townsend | B23K 9/295 | 219/137.42 |
| 4,334,730 A * | 6/1982 | Colwell | H01R 24/542 | 439/736 |
| 4,386,820 A * | 6/1983 | Dola | H01R 13/6453 | 439/651 |
| 4,397,516 A * | 8/1983 | Koren | H01R 24/568 | 439/607.45 |
| 4,415,214 A * | 11/1983 | Obst | H01R 13/645 | 439/353 |
| 4,460,238 A * | 7/1984 | Ireland | H01R 31/06 | 439/788 |
| 4,478,532 A * | 10/1984 | Puro | F16C 11/045 | 411/338 |
| 4,521,670 A * | 6/1985 | Case, Jr. | B23K 9/0956 | 219/136 |
| 4,529,861 A * | 7/1985 | Blanton | B23K 9/323 | 219/137.9 |
| 4,544,827 A * | 10/1985 | Cusick, III | B23K 9/282 | 219/137.9 |
| 4,554,433 A * | 11/1985 | Toothaker | B23K 9/323 | 219/137.31 |
| 4,568,134 A * | 2/1986 | DiMondi | H05K 7/1455 | 439/78 |
| 4,588,243 A * | 5/1986 | Ramsey | E21B 17/003 | 439/519 |
| 4,695,702 A * | 9/1987 | Gartland | B23K 9/295 | 219/137.31 |
| 4,702,539 A * | 10/1987 | Cusick, III | H01R 13/213 | 439/588 |
| 4,815,983 A * | 3/1989 | Erickson | H01R 27/00 | 439/518 |
| 4,864,099 A * | 9/1989 | Cusick, III | B23K 9/32 | 219/137.31 |
| 4,883,939 A * | 11/1989 | Sagi | B23K 9/32 | 901/42 |
| 4,967,055 A * | 10/1990 | Raney | H05H 1/3405 | 219/121.48 |
| 5,002,501 A * | 3/1991 | Tucker | H01R 4/2433 | 439/417 |
| 5,004,432 A * | 4/1991 | Tucker | H01R 4/2433 | 439/417 |
| 5,197,903 A * | 3/1993 | Casey | H01R 13/748 | 439/712 |
| 5,258,599 A * | 11/1993 | Moerke | B23K 9/295 | 219/121.48 |
| 5,297,314 A * | 3/1994 | Bender | E05D 7/121 | 16/270 |
| 5,333,976 A * | 8/1994 | Dobbrunz | F16B 5/0233 | 411/383 |
| 5,342,998 A * | 8/1994 | Nolte | H01B 17/26 | 174/152 R |
| 5,366,392 A * | 11/1994 | Raloff | H01R 13/213 | 439/889 |
| 5,384,447 A * | 1/1995 | Raloff | B23K 9/323 | 219/137.52 |
| 5,440,100 A * | 8/1995 | Stuart | B23K 9/287 | 219/137.61 |
| 5,491,321 A * | 2/1996 | Stuart | B23K 9/287 | 219/137.41 |
| 5,622,058 A * | 4/1997 | Ramakrishnan | F24F 13/20 | 62/298 |
| 5,772,102 A * | 6/1998 | New | B23K 9/173 | 219/137.42 |
| 5,841,105 A * | 11/1998 | Haczynski | B23K 9/295 | 219/124.02 |
| 5,866,874 A * | 2/1999 | Haczynski | B23K 9/296 | 219/137.31 |
| 5,874,709 A * | 2/1999 | New | B23K 9/32 | 219/137.9 |
| 5,902,150 A * | 5/1999 | Sigl | H01R 24/20 | 439/587 |
| 6,010,348 A * | 1/2000 | Alden | H01R 13/506 | 439/681 |
| 6,066,835 A * | 5/2000 | Hanks | B23K 9/28 | 219/137.52 |
| 6,078,023 A * | 6/2000 | Jones | B23K 9/323 | 219/137.62 |
| 6,225,599 B1 * | 5/2001 | Altekruse | B23K 9/287 | 219/137.61 |
| 6,278,085 B1 * | 8/2001 | Abukasm | H05B 3/36 | 219/544 |
| 6,454,576 B1 * | 9/2002 | Hedrick | H01R 13/5812 | 439/369 |
| 6,796,814 B1 * | 9/2004 | Handschke | H01R 13/5213 | 174/67 |
| 7,285,746 B2 * | 10/2007 | Matiash | B23K 9/32 | 242/615.3 |
| 7,374,074 B2 * | 5/2008 | Matiash | B23K 26/211 | 242/615 |
| 7,377,825 B2 * | 5/2008 | Bankstahl | B23K 9/32 | 439/337 |
| 7,389,900 B2 * | 6/2008 | Matiash | B23K 9/1336 | 242/615.3 |
| 7,390,989 B2 * | 6/2008 | Matiash | B23K 26/211 | 226/193 |
| 7,531,768 B2 * | 5/2009 | Matiash | B23K 9/1336 | 242/615.3 |
| 7,578,711 B2 * | 8/2009 | Robinson | H01H 71/08 | 439/801 |

(56) References Cited

U.S. PATENT DOCUMENTS

| | | | |
|---|---|---|---|
| 7,615,723 B2* | 11/2009 | Matiash | B23K 9/124 242/615.3 |
| 7,878,860 B1* | 2/2011 | Ouellette | H01R 13/502 439/638 |
| 8,334,457 B2* | 12/2012 | Garriga | H01R 43/005 29/840 |
| 8,426,773 B2* | 4/2013 | Willenkamp | B23K 9/1336 219/137.31 |
| 8,599,098 B1* | 12/2013 | Marshall | H01Q 1/085 343/888 |
| 9,308,599 B2* | 4/2016 | Sadowski | B23K 9/26 |
| 9,439,732 B2* | 9/2016 | Devengenzo | A61B 34/37 |
| 9,527,155 B2* | 12/2016 | Meess | B23K 9/26 |
| 10,155,278 B2* | 12/2018 | Matiash | B23K 9/1336 |
| 2001/0045695 A1* | 11/2001 | Andronica | B25B 5/147 269/268 |
| 2002/0100606 A1* | 8/2002 | Rule | H02G 3/22 174/151 |
| 2003/0015510 A1* | 1/2003 | Wakeman | B23K 9/295 219/73 |
| 2003/0027452 A1* | 2/2003 | Jazowski | H01R 13/53 439/475 |
| 2003/0209530 A1* | 11/2003 | Stuart | B23K 9/122 219/137.61 |
| 2005/0023263 A1* | 2/2005 | Blide | B23K 9/295 219/75 |
| 2005/0207467 A1* | 9/2005 | Montminy | H01R 4/56 373/92 |
| 2005/0218132 A1* | 10/2005 | Wells | B23K 9/291 219/137.61 |
| 2005/0224484 A1* | 10/2005 | Matiash | B23K 9/1336 219/137.2 |
| 2005/0224489 A1* | 10/2005 | Matiash | B23K 9/122 219/137.63 |
| 2006/0012984 A1* | 1/2006 | Coushaine | F21K 9/61 362/227 |
| 2006/0037945 A1* | 2/2006 | Schneider | H05H 1/34 219/121.52 |
| 2006/0273720 A1* | 12/2006 | Kwong | H01J 61/52 313/569 |
| 2007/0017912 A1* | 1/2007 | Flood | B23K 9/0282 219/125.11 |
| 2007/0108173 A1* | 5/2007 | Zamuner | B23K 9/287 219/137.31 |
| 2007/0280802 A1* | 12/2007 | Disantis | F16B 39/24 411/160 |
| 2007/0284353 A1* | 12/2007 | Laymon | B23K 9/293 219/137.31 |
| 2007/0284354 A1* | 12/2007 | Laymon | B23K 9/291 219/137.51 |
| 2008/0050988 A1* | 2/2008 | Burger | H01R 4/10 439/814 |
| 2008/0060835 A1* | 3/2008 | Stacy | H01B 19/04 174/152 R |
| 2008/0116177 A1* | 5/2008 | Hutchison | B23K 9/0673 219/136 |
| 2008/0242160 A1* | 10/2008 | Machet | H01R 4/64 439/805 |
| 2008/0246402 A1* | 10/2008 | Zayas | H01R 13/70 313/624 |
| 2008/0268692 A1* | 10/2008 | Dobler | H01R 27/00 439/346 |
| 2009/0017667 A1* | 1/2009 | Siebens | H01R 4/56 439/339 |
| 2009/0212034 A1* | 8/2009 | Willenkamp | B23K 9/1336 219/137.2 |
| 2009/0277881 A1* | 11/2009 | Bornemann | B23P 19/00 29/611 |
| 2010/0160977 A1* | 6/2010 | Gephart | A61B 17/7035 606/305 |
| 2010/0232908 A1* | 9/2010 | Chiu | F16B 5/0208 411/554 |
| 2010/0314376 A1* | 12/2010 | Zander | B25J 17/0241 219/138 |
| 2011/0059650 A1* | 3/2011 | Amidon | H01R 24/40 439/584 |
| 2011/0062130 A1* | 3/2011 | Barker | B23K 9/295 219/137.42 |
| 2011/0117773 A1* | 5/2011 | Delmas | H01R 13/533 439/544 |
| 2011/0287652 A1* | 11/2011 | Roscizewski | H01R 4/56 439/345 |
| 2012/0125904 A1* | 5/2012 | Lee | B23K 9/296 219/137.61 |
| 2012/0197449 A1* | 8/2012 | Sanders | G05B 15/02 710/305 |
| 2013/0176750 A1* | 7/2013 | Ray | F21V 23/06 362/227 |
| 2013/0240496 A1* | 9/2013 | Kinder | B23K 9/24 219/138 |
| 2013/0313241 A1* | 11/2013 | Zander | B23K 9/295 219/137.62 |
| 2013/0327748 A1* | 12/2013 | Salsich | B23K 9/0953 219/130.21 |
| 2014/0024241 A1* | 1/2014 | Siebens | H01R 13/207 439/310 |
| 2014/0038442 A1* | 2/2014 | Hung | B23K 9/323 439/191 |
| 2014/0045385 A1* | 2/2014 | Specht | H01R 25/003 439/661 |
| 2014/0049164 A1* | 2/2014 | McGuire | H05B 45/20 315/307 |
| 2014/0049963 A1* | 2/2014 | McGuire | F21K 9/232 362/382 |
| 2014/0049971 A1* | 2/2014 | McGuire | H05B 45/30 362/382 |
| 2014/0049972 A1* | 2/2014 | McGuire | F21K 9/23 362/427 |
| 2014/0073161 A1* | 3/2014 | Winningham | H01R 13/7175 439/271 |
| 2014/0199878 A1* | 7/2014 | Ihde | H01R 9/11 439/367 |
| 2014/0251972 A1* | 9/2014 | Garvey | H01R 4/56 219/137.61 |
| 2014/0262155 A1* | 9/2014 | Miller | B23K 37/0282 165/104.11 |
| 2014/0273586 A1* | 9/2014 | Sandwith | H01R 13/53 439/725 |
| 2015/0000177 A1* | 1/2015 | Liney | A01K 97/10 43/21.2 |
| 2015/0069039 A1* | 3/2015 | Lutgenau | B23K 9/173 219/137.31 |
| 2015/0129557 A1* | 5/2015 | Miller | B23K 37/003 219/136 |
| 2015/0132979 A1* | 5/2015 | Siebens | H01R 13/648 439/310 |
| 2015/0306654 A1* | 10/2015 | Breen | B21D 22/06 72/427 |
| 2015/0325992 A1* | 11/2015 | Longeville | H02G 3/083 174/541 |
| 2016/0016249 A1* | 1/2016 | Bellile | B23K 9/167 219/137.9 |
| 2016/0079717 A1* | 3/2016 | Bogart | H01R 13/58 439/620.21 |
| 2016/0121418 A1* | 5/2016 | Hanka | B23K 9/067 219/130.4 |
| 2016/0129517 A1* | 5/2016 | Altekruse | B23K 9/325 219/130.1 |
| 2016/0141801 A1* | 5/2016 | Siebens | H01R 43/16 439/92 |
| 2016/0328585 A1* | 11/2016 | Stewart | G06K 19/07758 |
| 2017/0136566 A1* | 5/2017 | Dessart | H01R 4/64 |
| 2017/0365959 A1* | 12/2017 | Flechl | H01R 13/635 |
| 2019/0003512 A1* | 1/2019 | Junkers | B25B 23/1415 |

(56) References Cited

U.S. PATENT DOCUMENTS

2019/0003513 A1* 1/2019 Junkers ................. F16B 43/00
2020/0021070 A1* 1/2020 Altekruse ............... B23K 9/32

OTHER PUBLICATIONS

"Euro Panel Socket Central Connector Adaptor for CO2 Mig Welding Machine Torch," retrieved from: https://www.banggood.com/Euro-Panel-Socket-Central-Connector-Adaptor-for-CO2-MIG-Welding-Machine-Torch-p-1021616.html, retrieved on Nov. 12, 2019, 8 pages.

Riverweld, "1 Set MIG MAG CO2 Welding Torch Euro Connector and Socket Connector Benzel Style," retrieved from: https://www.amazon.com/Welding-Torch-Connector-Socket-Binzel/dp/B01EZJI1AM/, retrieved on Nov. 12, 2019, 5 pages.

"Tweco Dinse Adaptor—50MM x 25MM W4017500," retrieved from: https://store.cyberweld.com/twdiad50x25w.html, retrieved on Nov. 12, 2019, 9 pages.

* cited by examiner

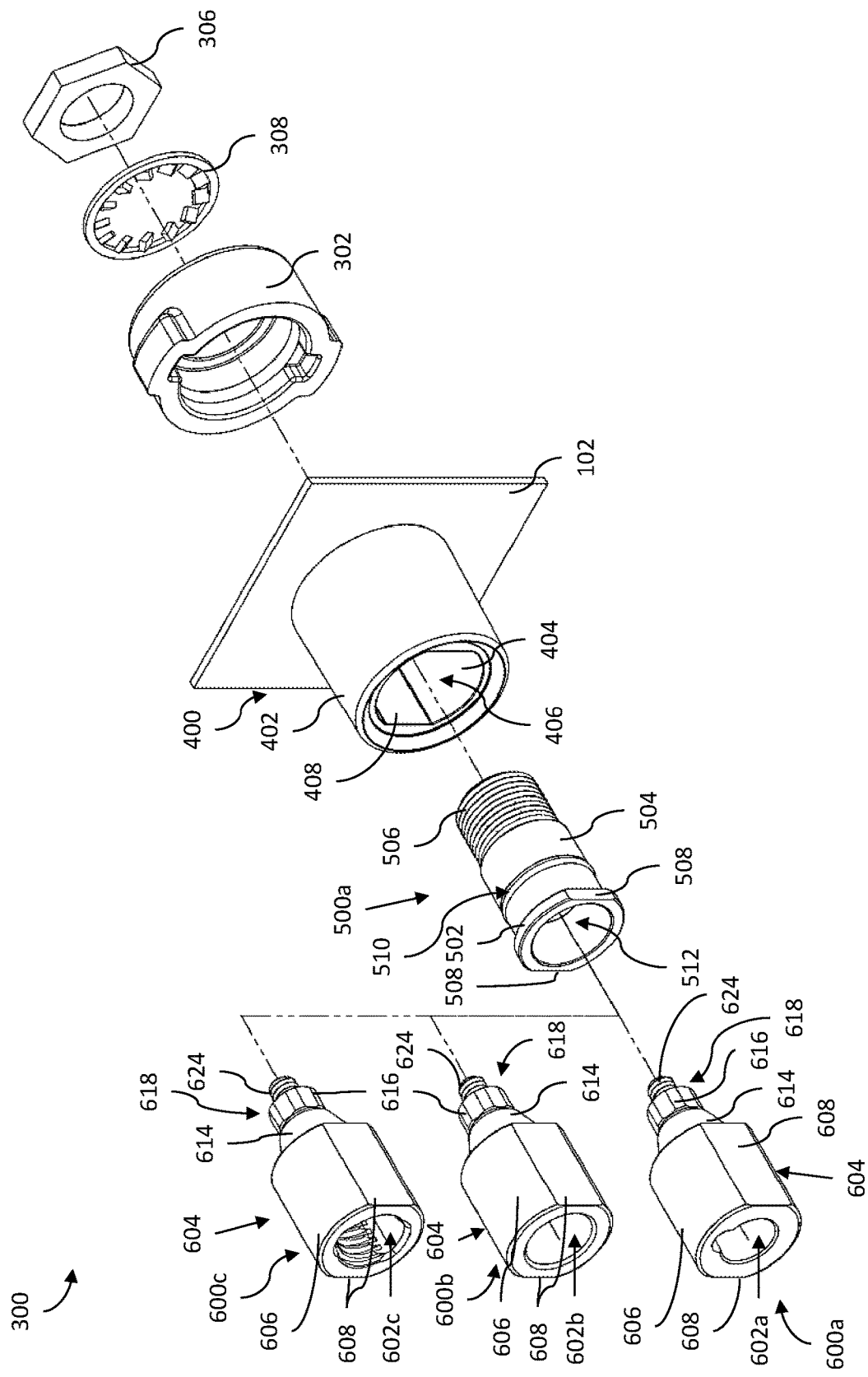

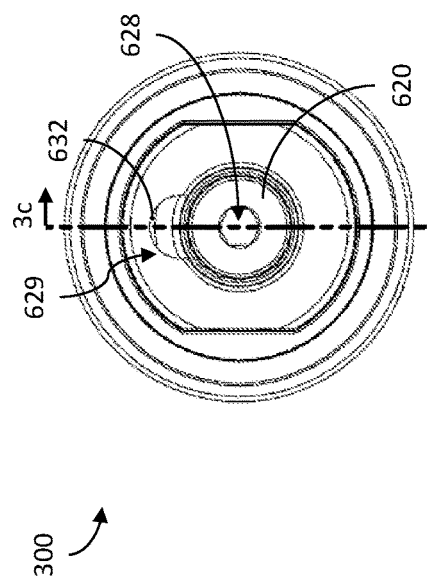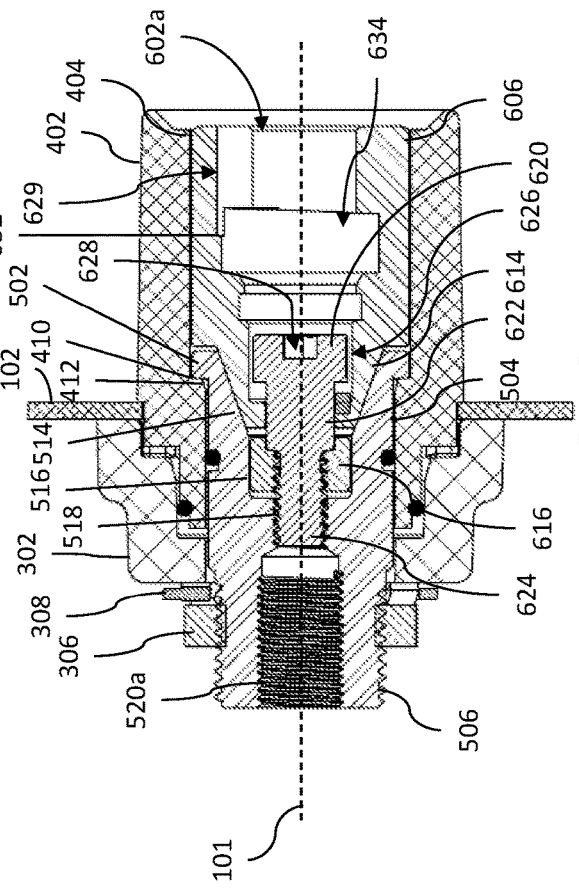

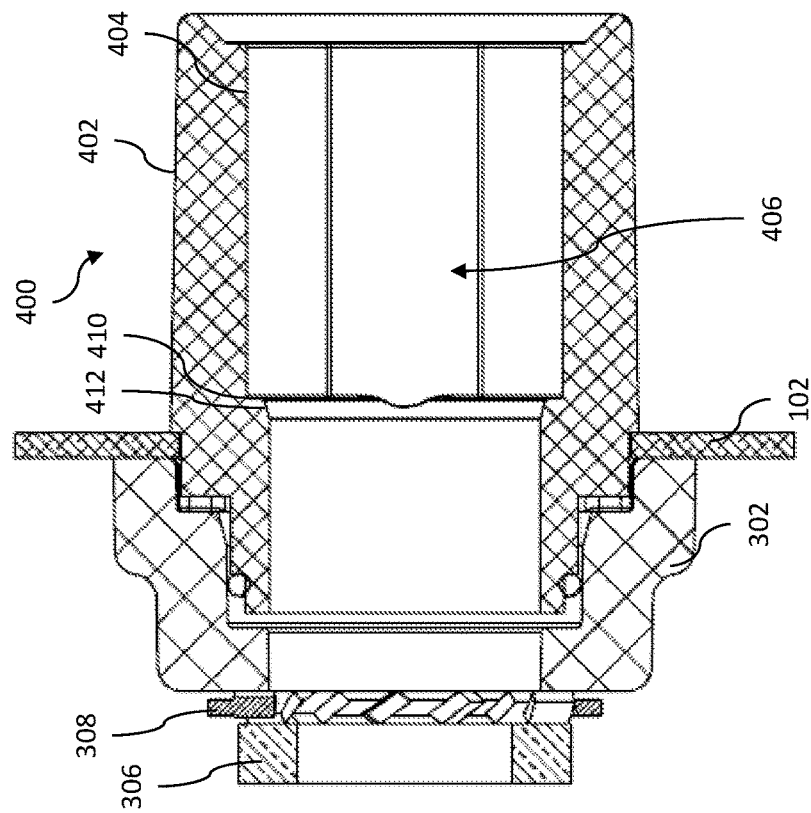
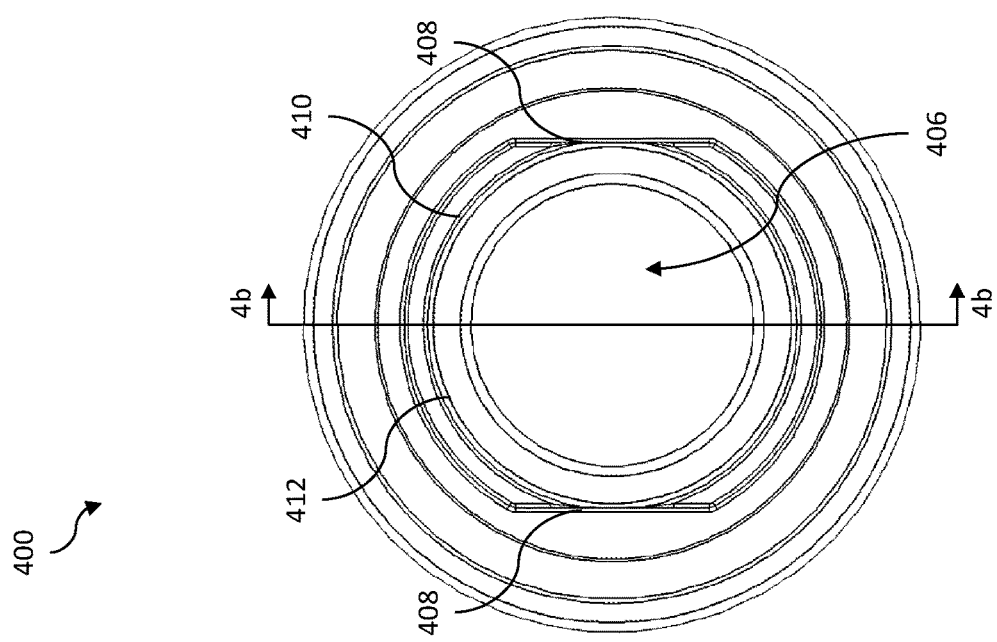
FIG. 4b
FIG. 4a

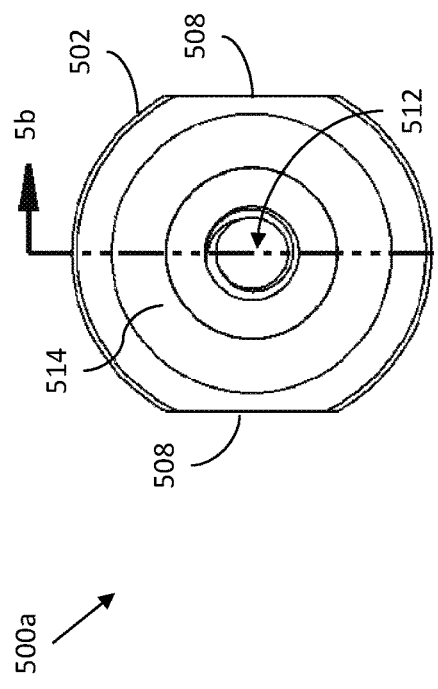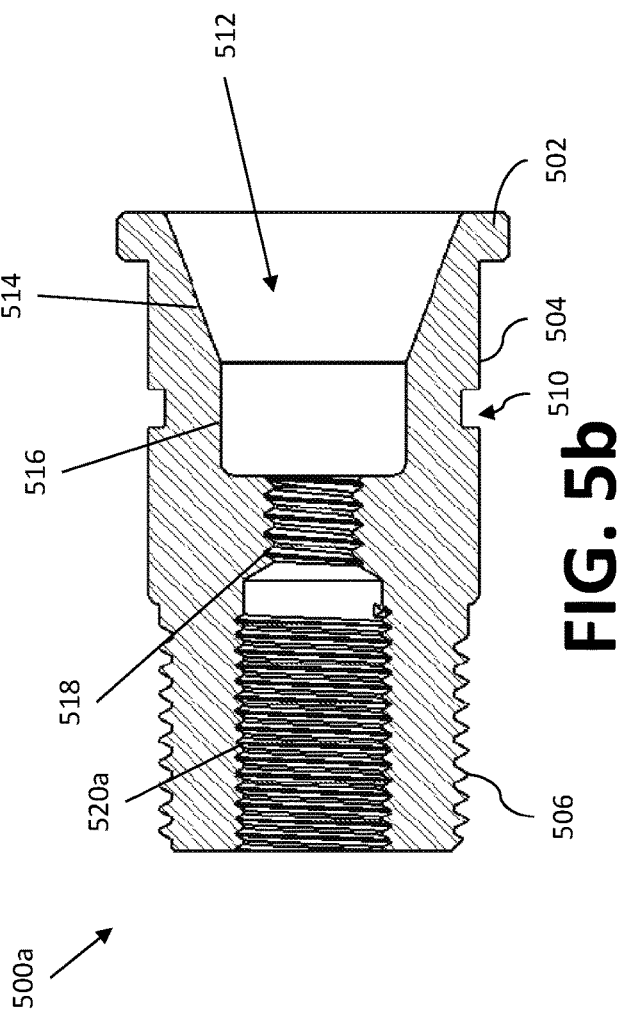

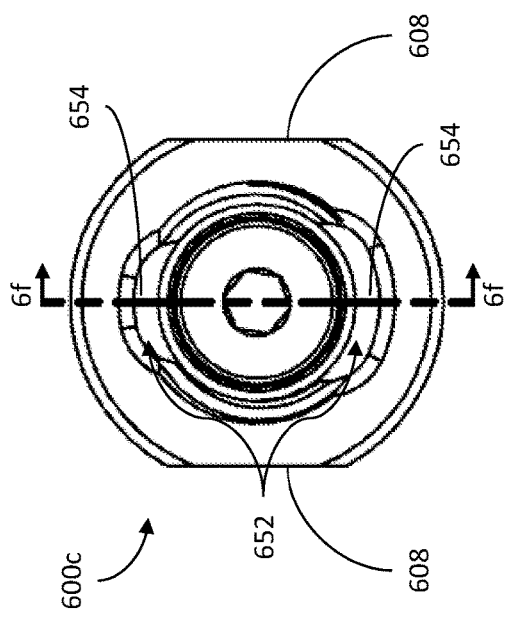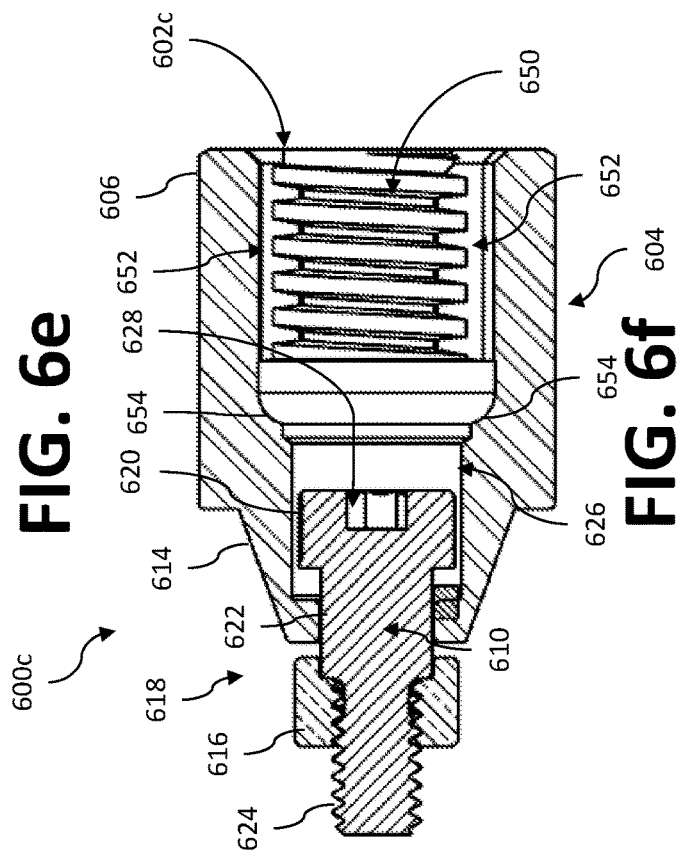

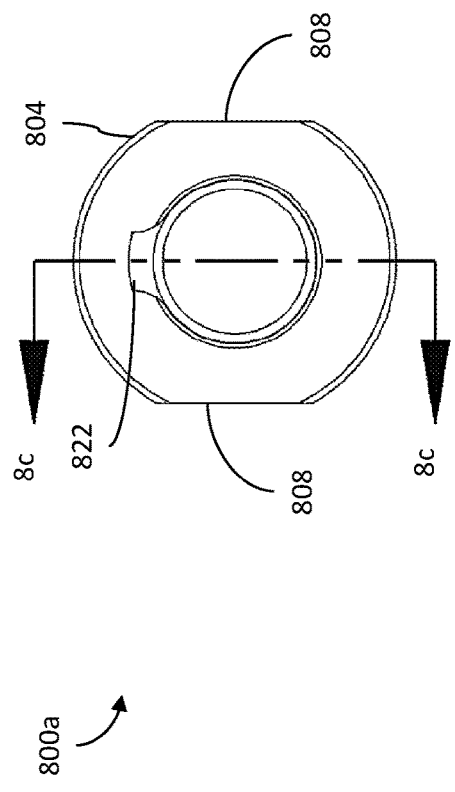
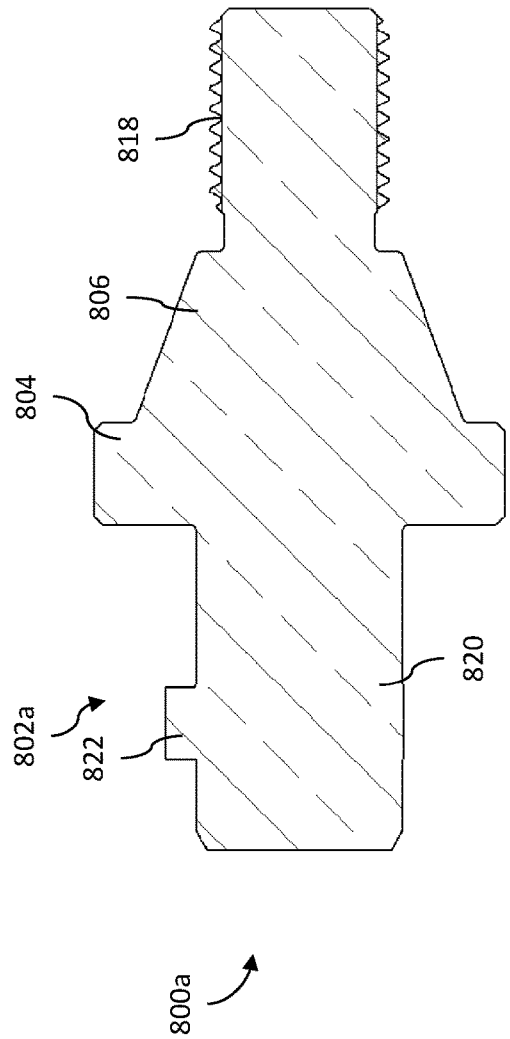

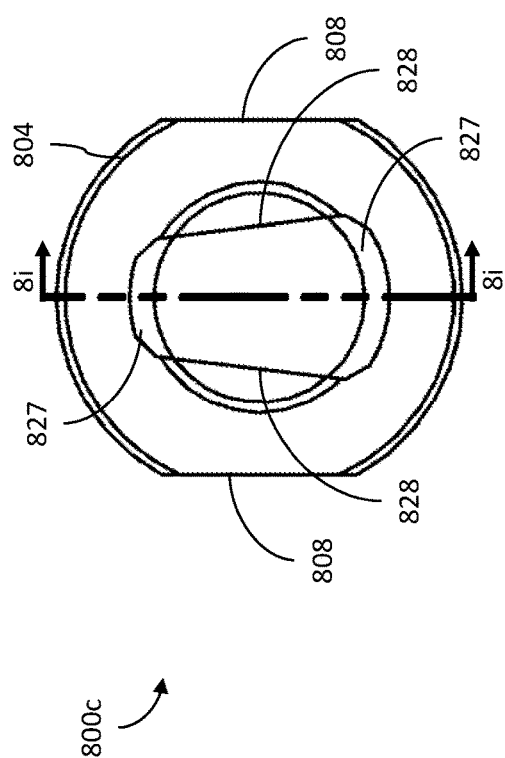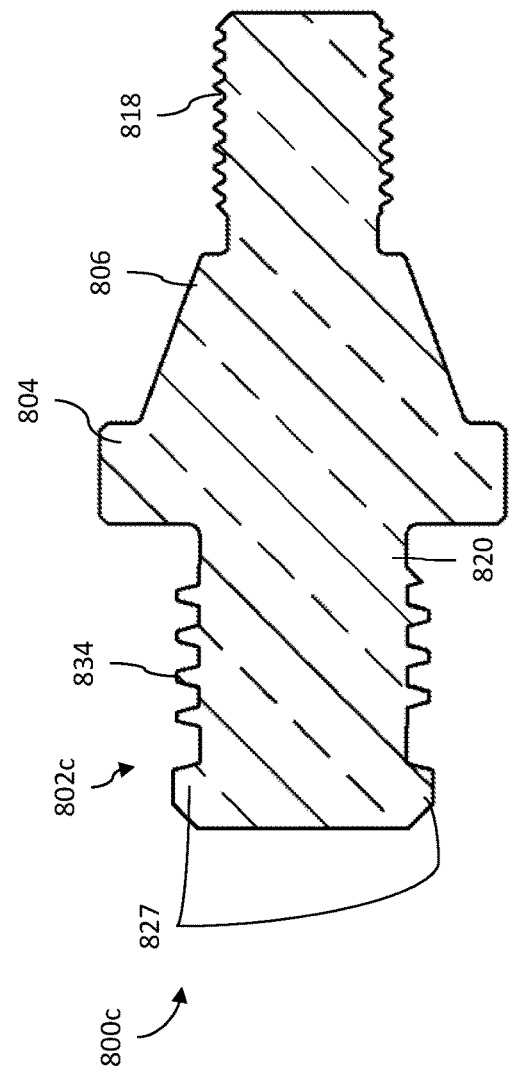

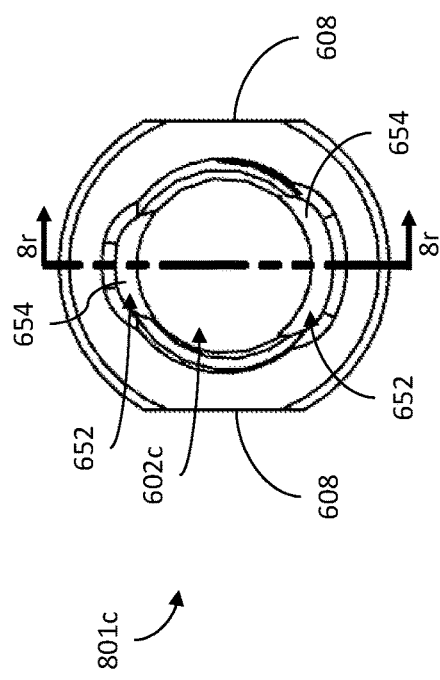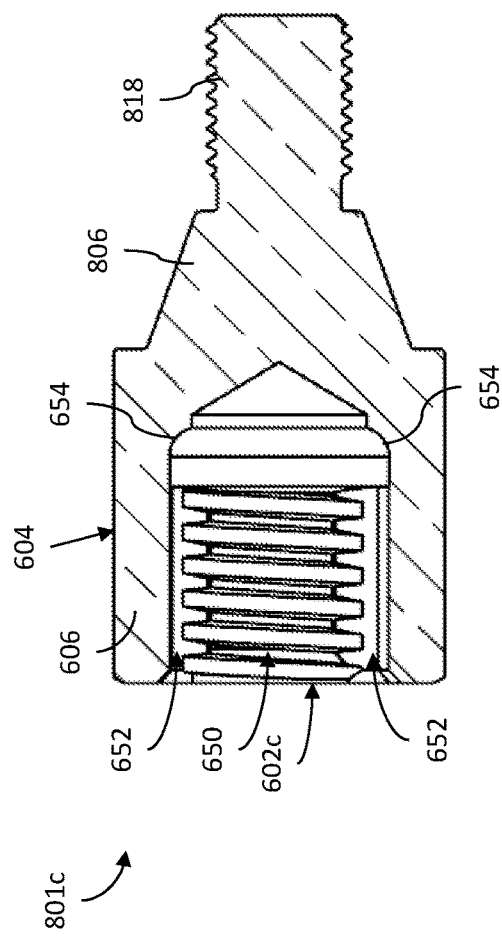

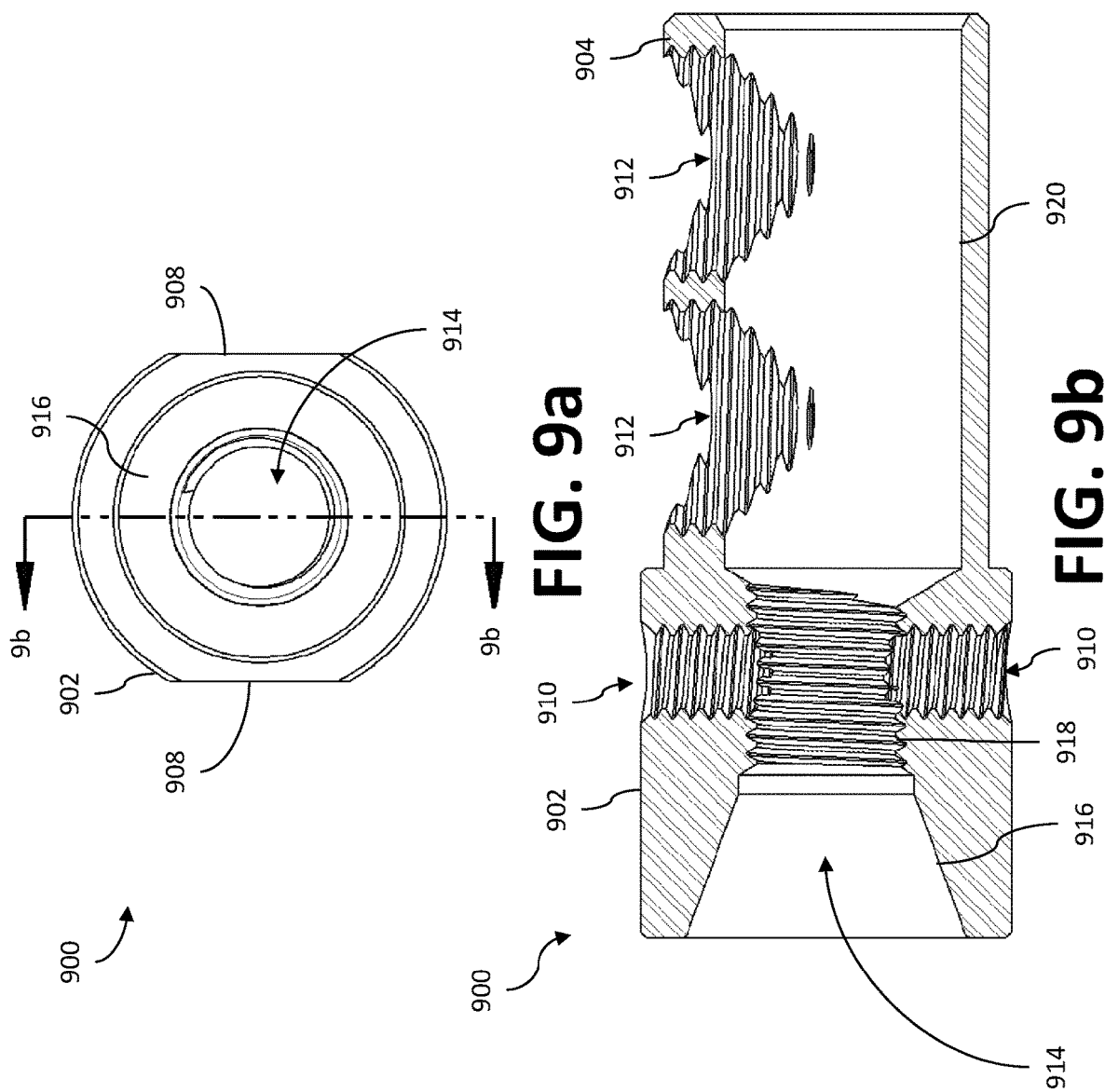

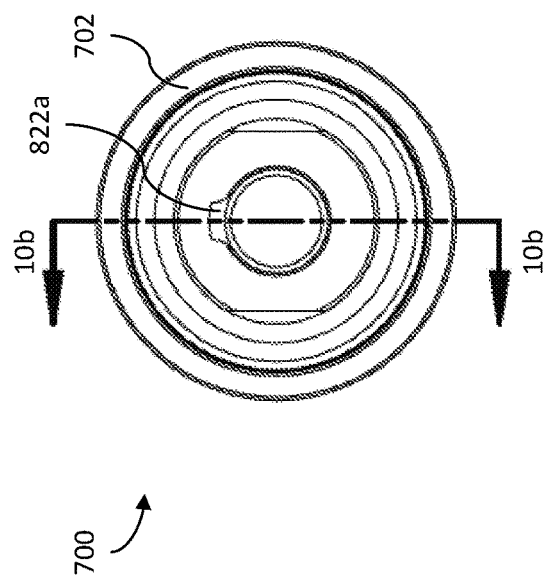
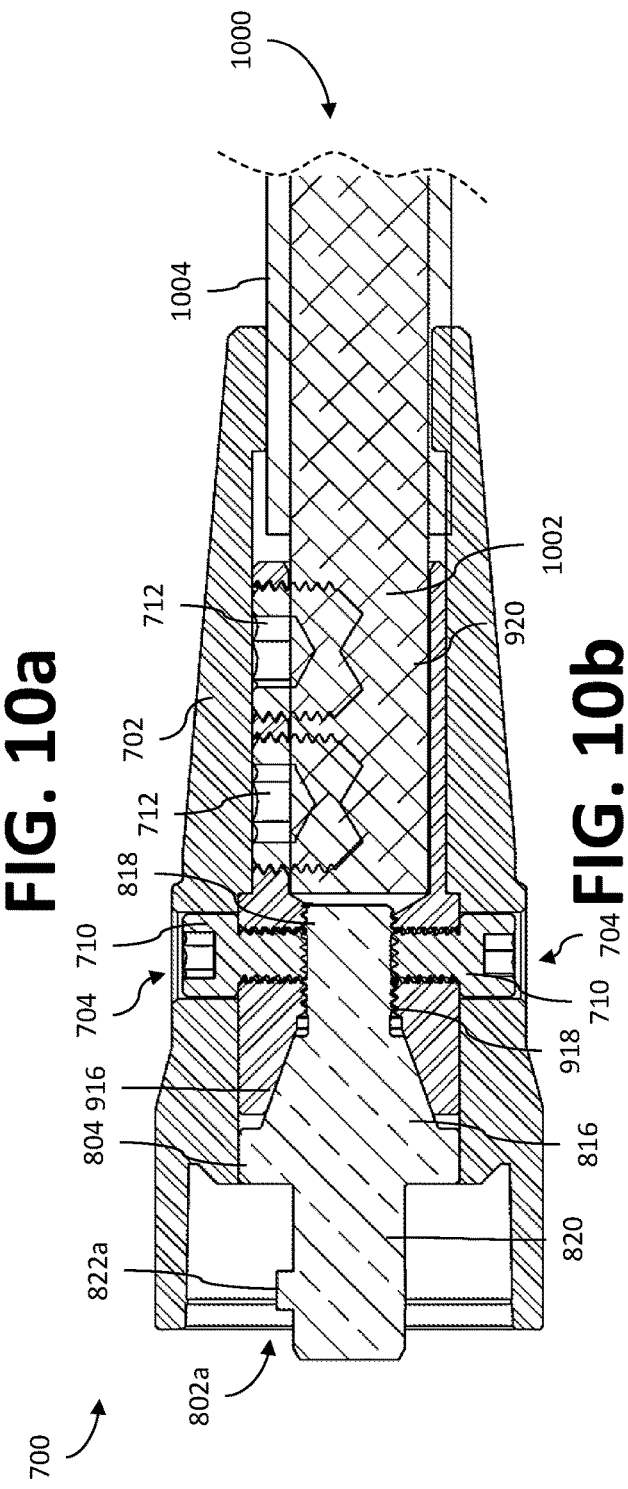

RECONFIGURABLE WELDING-TYPE POWER SOCKETS AND POWER PLUGS

CROSS REFERENCE TO RELATED APPLICATIONS

This application is a continuation of, and claims priority to, co-pending U.S. patent application Ser. No. 16/033,922, filed Jul. 12, 2018, entitled "Reconfigurable Welding-Type Power Sockets and Power Plugs," the entire contents of which are hereby incorporated by reference.

TECHNICAL FIELD

The present disclosure generally relates to welding-type systems, and more particularly to welding-type power sockets and power plugs that are configurable (and/or reconfigurable).

BACKGROUND

Some welding systems include welding components (e.g., torch, clamp, wire feeder, etc.) that are powered by a welding power supply. Power is transferred from a welding power supply to a welding component via a cable connection with a power socket of the power supply, such as through a plug end of the cable. However, some power supplies have power sockets that are configured to connect only with one particular type of plug and/or cable. This may make it difficult to connect one type of plug to a power socket designed for a different type of plug.

Limitations and disadvantages of conventional and traditional approaches will become apparent to one of skill in the art, through comparison of such systems with the present disclosure as set forth in the remainder of the present application with reference to the drawings.

SUMMARY

The present disclosure is directed to welding-type power sockets and plugs that are configurable (and/or reconfigurable), for example, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

FIG. 3a is a perspective exploded view of an example welding-type power socket, in accordance with aspects of this disclosure.

FIG. 3b is a front view of the example welding-type power socket of FIG. 3a with one of the socket inserts of FIG. 3a, in accordance with aspects of this disclosure.

FIG. 3c is a cross-section of the example welding type power socket of FIG. 3b, along the line 3c-3c in FIG. 3b, in accordance with aspects of this disclosure FIG. 4a is a front view of an example bulkhead, in accordance with aspects of this disclosure.

FIG. 4b is a cross-section of the example bulkhead of FIG. 4a, along the line 4b-4b of FIG. 4a, in accordance with aspects of this disclosure.

FIG. 5a is a front view of an example socket connector, in accordance with aspects of this disclosure.

FIG. 5b is a cross-section of the example socket connector of FIG. 5a, along the line 5b-5b of FIG. 5b, in accordance with aspects of this disclosure.

FIG. 6e is a front view of another example insert, in accordance with aspects of this disclosure.

FIG. 6f is a cross-section of the example insert of FIG. 6e, along the line 6f-6f of FIG. 6e, in accordance with aspects of this disclosure.

FIG. 8b is a front view of the example plug adapter of FIG. 8a, in accordance with aspects of this disclosure.

FIG. 8c is a cross-section of the example plug adapter of FIG. 8b, along the line 8c-8c of FIG. 8b, in accordance with aspects of this disclosure.

FIG. 8h is a front view of the example plug adapter of FIG. 8g, in accordance with aspects of this disclosure.

FIG. 8i is a cross-section of the example plug adapter of FIG. 8b, along the line 8c-8c of FIG. 8b, in accordance with aspects of this disclosure.

FIG. 8*q* is a front view of the example plug adapter of FIG. 8*p*, in accordance with aspects of this disclosure.

FIG. 8*r* is a cross-section of the example plug adapter of FIG. 8*q*, along the line 8*r*-8*r* of FIG. 8*q*, in accordance with aspects of this disclosure.

FIG. 9*a* is a front view of an example plug receptacle, in accordance with aspects of this disclosure.

FIG. 9*b* is a cross-section of the example plug receptacle of FIG. 9*a*, along the line 9*b*-9*b* of FIG. 9*a*, in accordance with aspects of this disclosure.

FIG. 10*a* is a front view of the plug assembly of FIG. 7*a*, with one of the plug adapters of FIG. 7*a*, in accordance with aspects of this disclosure.

FIG. 10*b* is a cross-section of the plug assembly of FIG. 10*a*, along the line 10*b*-10*b* in FIG. 10*a*, in accordance with aspects of this disclosure.

Figure 1:
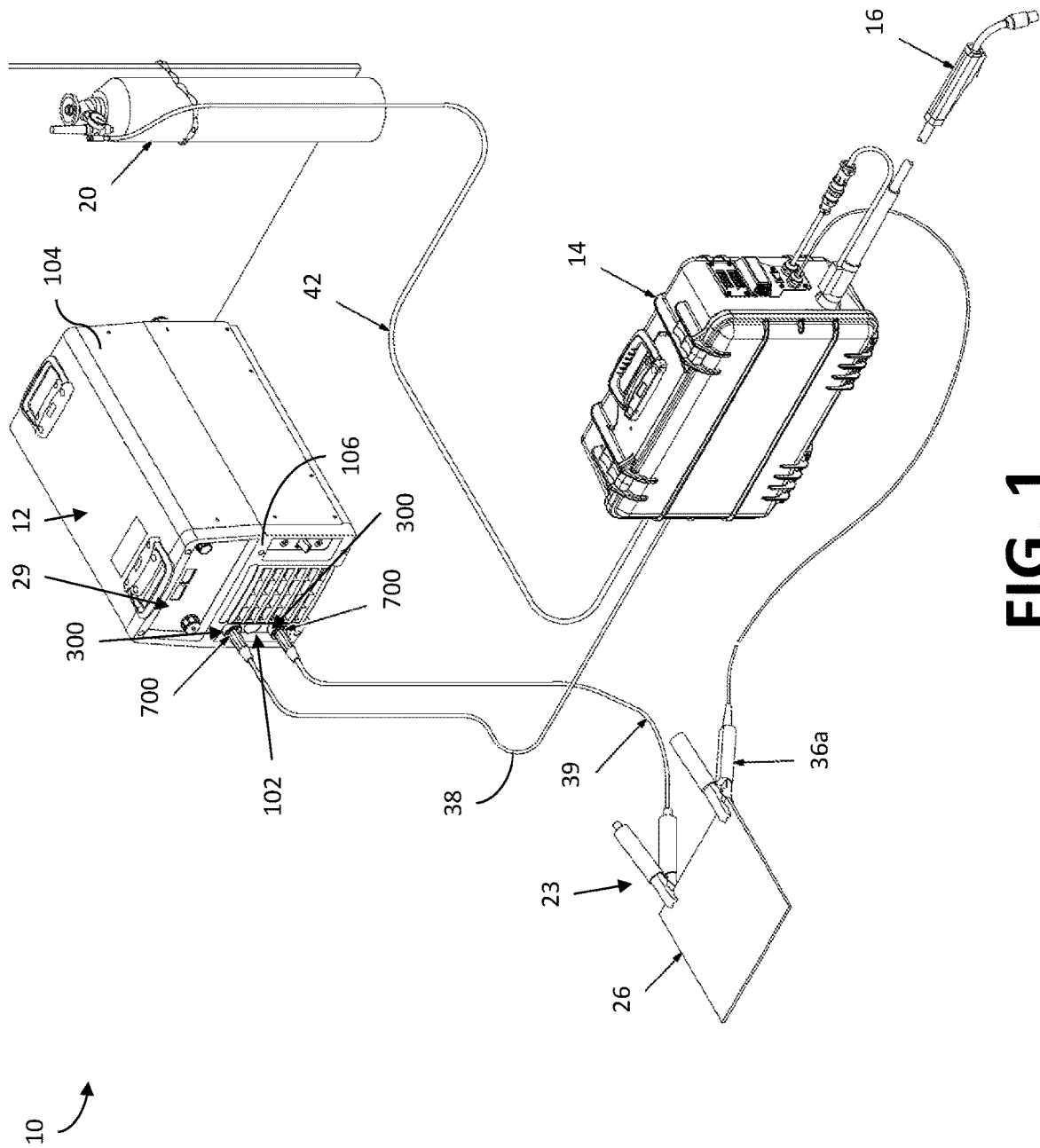
FIG. 1 illustrates an example of a welding-type system, in accordance with aspects of this disclosure.

The figures are not necessarily to scale. Where appropriate, similar or identical reference numerals are used to refer to similar or identical components. For example, reference numerals utilizing lettering (e.g., socket connector 500*a*, socket connector 500*b*) refer to instances of the same reference numeral that does not have the lettering (e.g., socket connectors 500).

DETAILED DESCRIPTION

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As utilized herein, the terms "e.g.," and "for example" set off lists of one or more non-limiting examples, instances, or illustrations.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

As used herein, the term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, CAC-A and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Some examples of the present disclosure relate to a removable insert for a socket of a welding power supply, comprising a base having a keyed entryway configured to connect with a key interface of a plug, a nose comprising a contact surface configured to make electrical contact with a complementary contact surface of a socket connector, and a coupler configured to couple the removable insert to the socket connector.

In some examples, the keyed entryway comprises a bore encircled by an inner surface of the base, the inner surface having a keyed surface. In some examples, the keyed surface comprises a latch that protrudes into the bore or an axial groove that expands the bore. In some examples, the contact surface comprises a frustoconical surface. In some examples, the coupler comprises a shoulder screw having a head, a screw thread, and a shank connecting the head to the screw thread, the screw thread configured to engage complementary threaded grooves of the socket connector. In some examples, the head of the shoulder screw is positioned within the nose, the head having a tool interface configured for coupling to a tool. In some examples, the coupler further comprises a nut engaged to the screw thread.

Some examples of the present disclosure relate to a welding power supply, comprising a housing having an electrical panel with an insulating bulkhead, and a socket connector within the insulating bulkhead, the socket connector comprising a bore encircled by an inner surface, the inner surface comprising a contact surface configured to make electrical contact with a complementary contact surface of a removable insert, and a coupling surface configured to engage a complementary coupling surface of the removable insert.

In some examples, the contact surface comprises a conical surface. In some examples, the coupling surface comprises threaded grooves. In some examples, the inner surface further comprises a central surface between the contact surface and the coupling surface. In some examples, the bore has a first diameter at the coupling surface, and a second diameter that is larger than the first diameter at the contact surface. In some examples, the bore has a third diameter at the central surface, the third diameter being larger than the first diameter and smaller than the second diameter. In some examples, the welding power supply further comprises power conversion circuitry positioned within the housing, the power conversion circuitry configured to generate welding-type output power and being in electrical communication with the socket connector.

Some examples of the present disclosure relate to a removable insert for a socket of a welding power supply, comprising a mechanical connector configured to mechanically connect the removable insert to a socket connector of the welding power supply, a first electrical connector configured to electrically connect the removable insert to the socket connector, and a second electrical connector configured to electrically connect the removable insert to a plug.

In some examples, the mechanical connector comprises a shoulder screw having a head, a screw thread, and a shank connecting the head to the screw thread, the screw thread configured to engage complementary threaded grooves of the socket connector. In some examples, the first electrical connector comprises an electrically conductive frustoconical surface. In some examples, the second electrical connector comprises a base having a keyed entryway configured to connect with a key interface of the plug. In some examples, the keyed entryway comprises a bore encircled by an inner surface of the base, the inner surface having a keyed surface. In some examples, the keyed surface comprises a latch that protrudes into the bore or an axial groove that expands the bore.

Some examples of the present disclosure relate to welding-type power sockets and/or welding-type plugs that are configurable (and/or reconfigurable) through custom socket inserts, socket connectors, plug adapters, and plug receptacles. Currently, conventional welding-type power supplies have power sockets that are configured to connect with only one particular type of plug. Likewise, conventional welding components have plugs configured to connect with only one particular type of power socket. Welding components having singular connection types make it difficult to connect a plug of one type to a power socket of a different type, and vice versa.

While it is possible to take apart a welding-type power supply and reconfigure the power sockets internally to work with a different type and/or style of plug, such an internal reconfiguration can be difficult, and/or time consuming. Devices do exist for external reconfiguration of welding-type power sockets. However, these devices often only loosely connect to the power sockets. Thus, when a plug is connected to a power socket through the device, the plug may be more securely coupled to the device than the device is coupled to the power socket, resulting in unintentional removal of the device from the power socket when the plug is removed from the power sockets. This risk of unintentional removal may be increased where the device and plug are attached and/or removed using the same or similar motion. Further, the devices tend to use the same structures and/or surfaces to establish both a mechanical and electrical connection with the power sockets. Therefore, a loose mechanical connection may also result in a loose and/or unreliable electrical connection.

Some examples of the present disclosure, therefore, relate to inserts that may be more securely coupled to welding-type power sockets, so as to configure (and/or reconfigure) the power sockets for connection to different plug types (and/or shapes, styles, designs, etc.) with less risk of unintentional removal. The adapters further include different surfaces and/or structures to establish mechanical, versus electrical, connections with the power sockets. Additionally, the methods, modes, motions, and/or mediums of connection between adapter and power socket are different than that of the connection between plug and adapter. Thus, the adapters may be more securely, effectively, and/or reliably used to configure (and/or reconfigure) the plugs and/or sockets.

Figure 2:
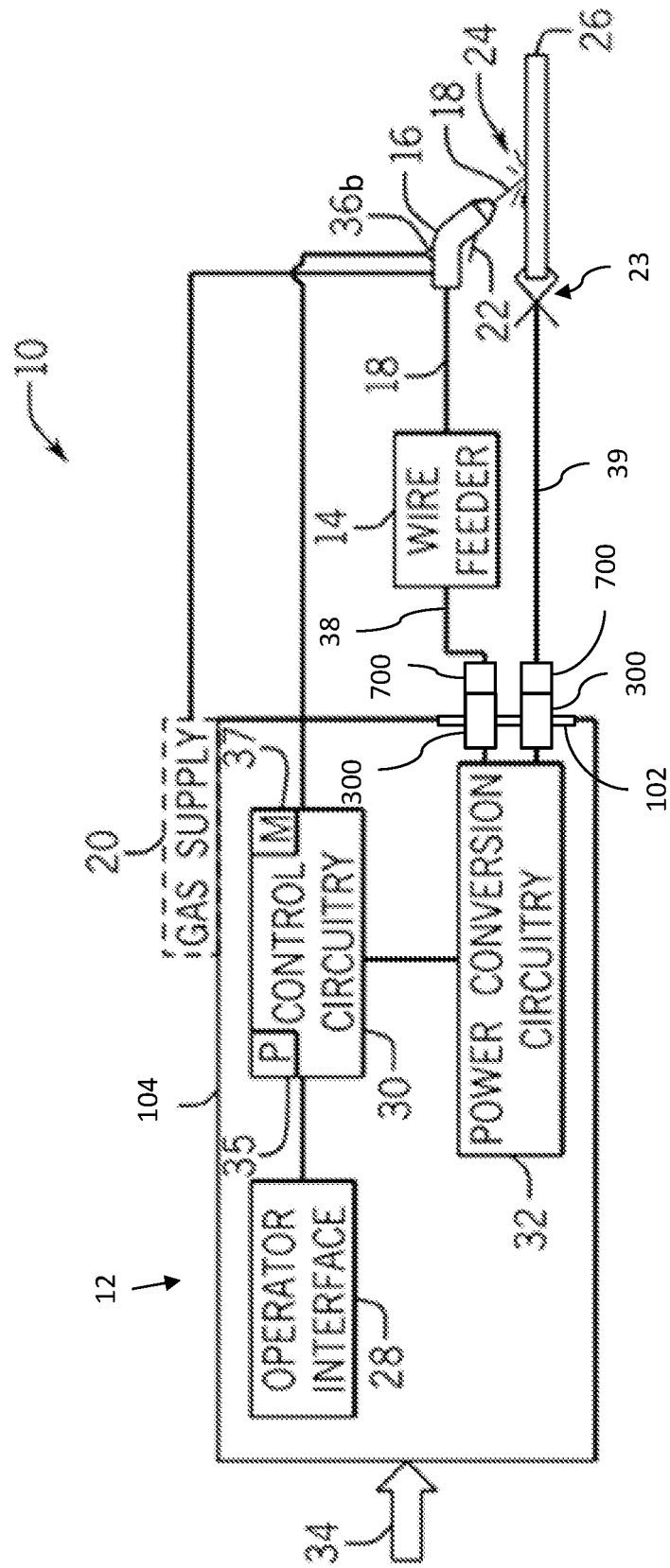
FIG. 2 is a block diagram of the example welding-type system of FIG. 1, in accordance with aspects of this disclosure.

FIGS. 1 and 2 show a perspective view and block diagram view, respectively, of an example of a welding-type system 10. It should be appreciated that, while the example welding-type system 10 shown in FIGS. 1 and 2 may be described as a gas metal arc welding (GMAW) system, the presently disclosed system may also be used with other arc welding processes (e.g., flux-cored arc welding (FCAW), gas shielded flux-cored arc welding (FCAW-G), gas tungsten arc welding (GTAW), submerged arc welding (SAW), shielded metal arc welding (SMAW), or similar arc welding processes) or other metal fabrication systems, such as plasma cutting systems, induction heating systems, and so forth.

In the example of FIGS. 1 and 2, the welding-type system 10 includes a welding-type power supply 12 (i.e., a welding-type power source), a welding wire feeder 14, a gas supply 20, and a welding torch 16. The welding-type power supply 12 generally supplies welding-type power for the various welding-type components and/or accessories of the welding-type system 10 (e.g., the welding wire feeder 14 and/or welding torch 16) through an electrical panel 102 of a housing 104 of the welding-type power supply. In the example of FIG. 1, the electrical panel 102 is part of a front panel 106 on the housing 104 of the welding-type power supply 12. In some examples, the electrical panel 102 may instead be part of a rear panel, a side panel, a top panel, and/or a bottom panel of the housing 104.

As shown in the examples of FIGS. 1 and 2, the electrical panel 102 includes welding-type power sockets 300. As shown, two of the power sockets 300 are connected to power plugs 700. The sockets 300 may be configured for positive polarity and/or negative polarity. In the example of FIG. 1, there is also a third (unlabeled) socket between the sockets 300. In some examples, there may be more or less than two sockets 300, such as a single socket and/or three or more sockets. In the example of FIG. 2, the sockets 300 extend through the housing 104, such that a portion of each socket 300 is both inside and outside the housing 104.

In the example of FIGS. 1 and 2, the welding-type power supply 12 is coupled to the welding wire feeder 14 and work piece 26 through the power sockets 300. More particularly, the wire feeder 14 and work piece 26 are connected to the power sockets 300 via plugs 700. One plug 700 is connected to one or more weld cables 38 which lead to the wire feeder 14, while another plug 700 is coupled to one or more lead cables 39 that lead to the work piece 26 through the work clamp 23. While not specifically labeled, in some examples, the welding wire feeder 14 may include one or more sockets and/or plugs as well.

In the illustrated examples, the welding wire feeder 14 is connected to the welding torch 16 in order to supply welding wire and/or welding-type power to the welding torch 16 during operation of the welding-type system 10. In some examples, the welding-type power supply 12 may couple and/or directly supply welding-type power to the welding torch 16. In the illustrated example, the power supply 12 is separate from the wire feeder 14, such that the wire feeder 14 may be positioned at some distance from the power supply 12 near a welding location. However, it should be understood that the wire feeder 14, in some examples, may be integral with the power supply 12. In some examples, the wire feeder 14 may be omitted from the system 10 entirely.

In the examples of FIGS. 1 and 2, the welding-type system 10 includes a gas supply 20 that may supply a shielding gas and/or shielding gas mixtures to the welding torch 16. A shielding gas, as used herein, may refer to any gas or mixture of gases that may be provided to the arc and/or weld pool in order to provide a particular local atmosphere (e.g., shield the arc, improve arc stability, limit the formation of metal oxides, improve wetting of the metal surfaces, alter the chemistry of the weld deposit, and so forth). In the example of FIG. 1, the gas supply 20 is coupled to the welding torch 16 through the welding wire feeder 14 via a gas conduit 42. In such an example, the welding wire feeder 14 may regulate the flow of gas from the gas supply 20 to the welding torch 16. In the example of FIG. 2, the gas supply 20 is depicted as coupled directly to the welding torch 16 rather than being coupled to the welding torch 16 through the wire feeder 14. The gas supply 20 may be integral with or separate from the power supply 12. In some examples, no gas supply 20 may be used.

In the example of FIG. 2, the welding-type power supply 12 includes an operator interface 28, control circuitry 30, and power conversion circuitry 32. The power conversion circuitry 32 is configured to receive input power from a power source 34 (e.g., the AC power grid, an engine/generator set, or a combination thereof), and adjust the input power as appropriate for a desired welding-type application. Though the power source 34 is shown in FIG. 2 as being outside the housing 104, in some examples the power source 34 may be internal to the housing 104. The power conversion circuitry 32 is configured to output welding-type power to the wire feeder 14 and/or work piece 26 through the power sockets 300. The control circuitry 30 may control the power conversion circuitry 32 to produce the appropriate and/or desired welding-type power. An operator may provide weld input and/or weld settings (e.g., regarding the appropriate and/or desired welding-type power) through the operator interface 28.

The power conversion circuitry 32 may include circuit elements (e.g., transformers, rectifiers, capacitors, inductors, diodes, transistors, switches, and so forth) capable of converting input power to welding-type output power. In some examples, the welding-type output power of the power conversion circuitry 32 may comprise one or more of a direct current electrode positive (DCEP) output, direct current electrode negative (DCEN) output, DC variable polarity, and/or a variable balance (e.g., balanced or unbalanced) AC output, as dictated by the demands of the welding-type system 10 (e.g., based on the type of welding process performed by the welding-type system 10, and so forth).

The control circuitry 30 is configured to control the power conversion circuitry 32 using one or more control algorithms. In the example of FIG. 2, the control circuitry 30 comprises one or more processors 35 and/or memory 37. The one or more processors 35 may use data stored in the memory 37 to execute the control algorithms to control the power conversion circuitry 32. In some examples, the control circuitry 30 may use input from feedback sensors and/or an operator to control the power conversion circuitry 32.

In some examples, the welding-type system 10 may receive weld settings from the operator via the operator interface 28. In the example of FIG. 1, control elements 29 of the operator interface 28 are provided on the front panel 106 of the housing 104, proximate the electrical panel 102. As shown, the control elements 29 may include switches, knobs, gauges, etc. In the example of FIG. 2, the operator interface 28 is coupled to the control circuitry 30, and may communicate the weld settings to the control circuitry 30 via this coupling.

In the example of FIGS. 1 and 2, the welding-type system 10 includes one or more sensors 36. The control circuitry 30 may monitor the current and/or voltage of the arc 24 using the sensors 36. In the examples of FIGS. 1 and 2, a first sensor 36a is clamped to the work piece 26, and a second sensor 36b is positioned on and/or proximate to the welding torch 16. In some examples, additional sensors 36 may positioned on and/or proximate the wire feeder 14 and/or weld cable 38. The one or more sensors 36 may comprise, for example, current sensors, voltage sensors, impedance sensors, and/or other appropriate sensors. In some examples, the control circuitry 30 may determine and/or control the power conversion circuitry 32 to produce an appropriate power output, arc length, and/or electrode extension based at least in part on feedback from the sensors 36.

The power conversion circuitry 32 may provide DC and/or AC welding-type output power via the power sockets 300. As such, the welding-type power supply 12 may power the welding wire feeder 14 that, in turn, powers the welding torch 16, in accordance with demands of the welding-type system 10. The lead cable 39 terminating in the clamp 23 couples the welding-type power supply 12 to the work piece 26 to close the circuit between the welding-type power supply 12, the work piece 26, and the welding torch 16. An operator may engage a trigger 22 of the torch 16 to initiate an arc 24 between a wire electrode 18 fed through the torch 16 and the work piece 26. In some examples, engaging the trigger 22 of the torch 16 may initiate a different welding-type function, instead of an arc 24.

FIG. 3a shows an exploded view of an example power socket assembly 300. FIG. 3c shows an assembled cross-sectional view of the power socket assembly 300. While the example power socket assembly 300 shown in FIGS. 3a and 3c shows only the socket connector 500a, it should be understood that socket connector 500b could also have been used. Likewise, while the cross-section of FIG. 3c shows only the socket insert 600a and socket connector 500a, any combination of socket inserts 600 and socket connectors 500 shown in FIGS. 3a and 5a-6f may be used to form the power sockets 300 in FIGS. 1 and 2. It should be understood that the disclosed example power sockets 300 may be used to provide multiple power outputs in the electrical panel 102. When fully assembled, the components of the power socket assembly 300 are approximately centered about a common axis 101, as shown, for example in FIG. 3c.

In the examples of FIGS. 3a-3c, each power socket 300 includes an insulating bulkhead 400, an insulating cap 302, a socket connector 500, and a socket insert 600. The insulating bulkhead 400 formed on the electrical panel 102 extends from an exterior of the housing 104, through the electrical panel 102, and into an interior of the housing 104. The insulating cap 302 encircles the bulkhead 400 within the housing 104 (see also FIGS. 4a and 4b). The insulating bulkhead 400 and/or insulating cap 302 may be formed of an electrically insulating material. In some examples, the bulkhead 400 and/or cap 302 may additionally, or alternatively, be formed of a thermally insulating material.

In the examples of FIGS. 3a-4b, the insulating bulkhead 400 includes a generally cylindrical exterior surface 402 extending from the electrical panel 102 on the exterior of the housing 104. An interior surface 404 of the bulkhead 400 surrounds a slot 406 that extends through the electrical panel 102 and bulkhead 400 into the housing 104. The interior surface 404 of the bulkhead 400 is approximately circular and/or cylindrical, with two parallel straight edge portions 408 truncating the circular/cylindrical shape. The resulting shape of the slot 406 is similar to the shape of a collar 502 of the socket connector 500, so that the socket connector 500 may snugly fit within the slot 406, as further explained below.

As may be seen, for example, in FIG. 4b, the slot 406 has a diameter that decreases as the slot 406 extends inward toward the cap 302. More particularly, the inner surface 404 of the bulkhead 400 includes a shoulder 410 and taper 412 that narrows the diameter of the slot 406. The shoulder 410 and/or taper 412 are configured to abut the collar 502 of a socket connector 500 when a socket connector 500 is inserted into the slot 406, so as to help retain the socket connector 500 within the slot 406 and prevent the socket connector 500 from moving farther into the interior of the housing 104.

FIGS. 5a-5d show two different example socket connectors 500. The socket connectors 500 may comprise electrically conductive material, such as brass and/or copper, for example. In some examples, the different socket connectors 500 may be used to output different power polarities, such that one socket connector 500 is used in the electrical panel 102 to output positive polarity welding-type power while the other socket connector 500 is used in the electrical panel 102 to output negative polarity welding-type power. In some examples, two of the same socket connectors 500 may be used to output both positive and negative polarity welding-type power. In some examples, one of the socket connector 500 may be used in the electrical panel 102 and configured to output positive or negative polarity welding-type power, while a different socket connector (not shown) may be used in the electrical panel 102 and configured to output the other polarity of welding-type power. In some examples, the operator interface 28 may include a control element that allows for selection of power socket polarity.

In the examples of FIGS. 5a-5d, each socket connector 500 comprises an inner surface and an outer surface. The outer surface includes a collar 502, a body 504 that extends from the collar 502, and a nose 506 that extends from the body 504. In the examples of FIGS. 3a-5d, the collar 502 is generally circular, with two opposing and/or parallel wrench flats 508. The collar 502 has a shape similar to that of the slot 406, so as to provide a snug fit within the slot 406. The collar 502 may be configured to abut the shoulder 410 and/or taper 412 of the bulkhead 400 when assembled within the slot 406.

Figure 5C:
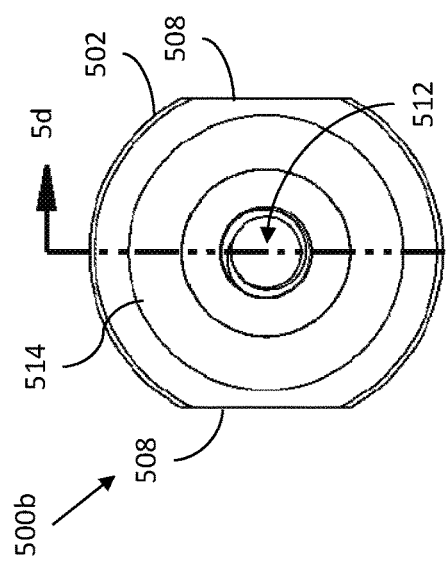
FIG. 5c is a front view of another example socket connector, in accordance with aspects of this disclosure.
Figure 5D:
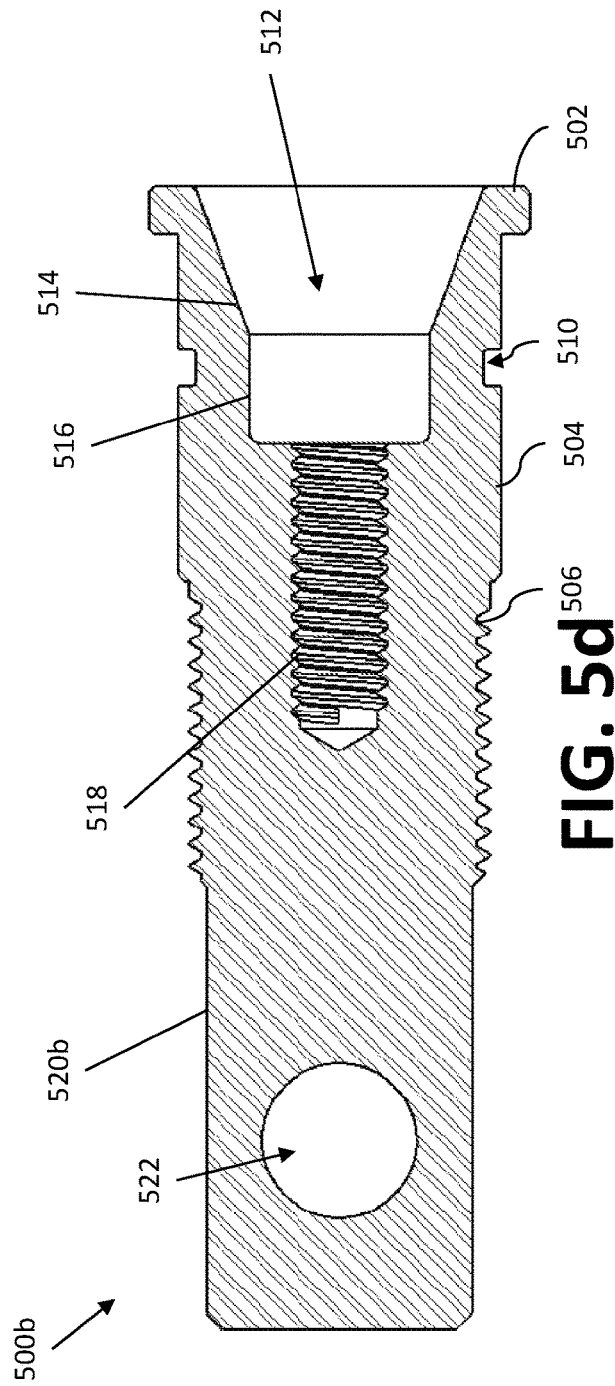
FIG. 5d is a cross-section of the example socket connector of FIG. 5d, along the line 5d-5d in FIG. 5c, in accordance with aspects of this disclosure.

In the examples of FIGS. 5a-5d, the body 504 of each socket connector 500 is generally cylindrical, and includes a groove 510 in an approximate middle of the body 504 configured to fit an O-ring. In the example of FIGS. 5b and 5d, the collar 502 has the largest outer diameter, followed by the body 504, then the nose 506, and then the groove 510. When the power socket 300 is fully assembled, the body 504 may be substantially and/or entirely covered by bulkhead 400 and/or cap 302. However, the nose 506 extends forward from the body 504, such that the nose 506 extends further into the housing 104, beyond the cap 302, therefore remaining uncovered within the housing 104.

In the examples of FIGS. 5a-5d, the nose 506 includes engagement features, such as screw threads, for example. The engagement features of the nose 506 may be configured to engage with complementary engagement features (e.g., threaded grooves) of a nut 306. As may be seen in FIGS. 3a and 3c, for example, the nut 306 may be combined with a washer 308 to retain the socket connector 500 within the slot 406 (in conjunction with the shoulder 410 and/or taper 412) and to retain the cap 302 over the bulkhead 400 and/or body 504 of the socket connector 500.

In the examples of FIGS. 5a-5d, the inner surface of each socket connector 500 surrounds a bore 512 that extends through the socket connector 500. The inner surface of the socket connector includes a contact surface 514, a coupling surface 518, and a central surface 516. In the examples of FIGS. 5b and 5d, the contact surface 514 extends from the collar 502 into the body 504, and terminates short of the groove 510. The central surface 516 extends from the contact surface 514 towards the nose 506. The coupling surface 518 extends from the central surface 516 towards a receiving surface 520, further explained below. As shown, the diameter of the bore 512 is largest at the contact surface and smallest at the coupling surface 518, with the bore 512 having a diameter at the central surface 516 that is larger than the diameter of the bore 512 at the coupling surface 518, but smaller than the diameter of the bore 512 at the contact surface 514.

The contact surface 514 is configured to make electrical contact with a nose 614 of an insert 600. In the examples of FIGS. 5b and 5d, the contact surface 514 is approximately conical (and/or frustoconical), such that the bore 512 decreases in diameter traveling from the collar 502 in towards the central surface 516. The conical (and/or frustoconical) shape of the contact surface 514 provides a substantial surface area for electrical contact, and increases the likelihood of good electrical contact when an insert 600 is firmly secured to the socket connector 500.

In the examples of FIGS. 5b and 5d, the central surface 516 lies between the contact surface 514 and the coupling surface 518. The central surface 516 encircles a portion of the bore 512 that is configured to fit a nut 616 of the insert 600. The coupling surface 518 is configured to engage a complementary coupler 618 of the insert 600. The coupling surface 518 may include engagement features, such as, for example, threaded grooves, to connect with (and/or attach to) complementary engagement features of a coupler 618 of the insert 600.

In the example of FIG. 5b, the inner surface of the socket connector 500a further includes a receiving surface 520a that is configured to receive and make contact with one or more electrical conductors (and/or wires, wiring, cables, leads, clips etc.) coming from the power conversion circuitry 32. In some examples, the electrical conductors may extend into the bore 512 encircled by the receiving surface 520a so as to connect the socket connector 500 to the power conversion circuitry 32. In some examples, the socket connector 500 may additionally, or alternatively, be connected to the power conversion circuitry 32 via the nose 506, which may make electrical contact with one or more electrical conductors. In the example of FIG. 5d, the socket connector 500b has a different receiving surface 520b that is part of the outer surface of the socket connector 500b. The receiving surface 520b extends from the nose 506, and has a hole 522 that may receive a bolt or other fastener so as to couple the one or more electrical conductors to the socket connector 500b.

Each socket connector 500 is configured for coupling to a plurality of inserts 600. In the example of FIG. 3a, three inserts 600 are shown. Any of the inserts 600 may be coupled to either socket connector 500. In some examples, other inserts (not shown) may be coupled to the socket connectors 500. Each insert 600 may be comprised of an electrically conductive material, such as brass, copper, and/or any other appropriately conductive material. As shown, each insert 600 has a "male" end with a coupler 618 for connecting to the socket connector 500, and a "female" end with a keyed entryway 602 for connecting to a key interface 802 of a plug 700, as discussed further below. In some examples, an insert 600 may instead include two "male" ends. However, having one end be a "male" end and the other end be a "female" end configured for connecting to the plug 700 advantageously avoids additional and/or unnecessary outcroppings on the welding-type power supply 12 and/or power supply housing 104.

Each "female" end keyed entryway 602 is configured to accept (and/or receive, connect with, attach to, engage with, etc.) a particular type of plug 700 that has a particular complementary (and/or matching) key interface 802. The coupler 618 of each insert 600 has engagement features configured for secure external connection to the complementary engagement features of the coupling surface 518 of the socket connector 500. Thus, an operator may securely and externally reconfigure a power socket 300 of a welding-type power supply 12 for a different type of plug 700, without having to access the internals of the housing 104, and without worrying that the insert 600 will become mechanically and/or electrically removed from the power socket 300 if/when the operator removes the plug 700 from the power socket 300.

In the examples of FIGS. 3a and 6a-6f, each insert 600 includes body 604 and a coupler 618. The body includes a base 606 and a nose 614. As shown, the base 606 has an outer surface that is approximately cylindrical, with parallel and opposing flats 608 that truncate the cylinder. The shape of the base 606 approximates that of the slot 406 of the bulkhead 400, so that the insert 600 may fit within the bulkhead 400 to connect with the socket connector 500. As shown, the nose 614 extends from the base 606. In the examples of FIGS. 3a and 6a-6f, the nose 614 is approximately conical (and/or frustoconical), being shaped (and/or configured) to electrically contact (and/or connect) with the contact surface 514 of the socket connector 500.

In the examples of FIGS. 3a and 6a-6f, each insert 600 includes a coupler 618 comprising a shoulder screw 610 and a nut 616 engaged to the shoulder screw 610. As shown, the shoulder screw 610 includes a head 620 attached to a shank 622. The shank 622 extends between the head 620 and a screw thread 624. The head 620 is positioned within a recess 626 of the nose 614, and includes a tool interface 628 configured to receive a work end of a tool, such as a screwdriver and/or Allen wrench, for example. When assembling and/or disassembling the insert 600 into and/or out of the power socket 300, an operator may insert a tool end of a tool into the tool interface 628 and turn the shoulder screw 610 via the tool and tool interface 628 connection, so as to couple and/or uncouple the screw threads 624 from the coupling surface 518 of the socket connector 500.

In the examples of FIGS. 3a and 6a-6f, the screw threads 624 extend out of the nose 614 of the insert 600, along with a small sliver of the shank 622. As shown, the nut 616 is engaged to the screw threads 624 adjacent to the nose 614. As the shoulder screw 610 is not integrally connected to the rest of the insert 600 in the examples of FIGS. 3a and 6a-6f, the nut 616 ensures that body 604 is removed along with the shoulder screw 610 when removing the insert 600 from the socket connector 500. For instance, during operation, the power socket 300 may undergo heating due to thermal effects of the electrical power conducted through the power socket 300. The power socket 300 may eventually cool down when the welding-type system 10 and/or welding-type power supply 12 is no longer in use. The repeated heating and cooling may cause the nose 614 of the insert 600 to partly fuse with the contact surface 514 of the socket connector 500. Thus, without the nut 616, an operator may attempt to remove the insert 600 via the tool interface 628 of the shoulder screw 610, and only succeed in removing the shoulder screw 610 from the body 604 of the insert 600, while the nose 614 (and/or body 604) of the insert 600 remains fused to the contact surface 514. However, with the nut 616 in place, the shoulder screw 610 is prohibited from being removed from the body 604 of the insert 600. Instead, the mechanical force that would have removed the shoulder screw 610 from the body 604 of the insert 600 is instead applied to the nut 616, and in turn applied by the nut 616 to the nose 614. This mechanical force may help to dislodge a fused nose 614 and contact surface 514, and allow the insert 600 to be successfully removed from the socket connector 500.

As shown in the examples of FIGS. 3a and 6a-6f, the base 606 of each insert 600 includes a keyed entryway 602. Each keyed entryway 602 is configured to receive a particular key interface 802 of a plug 700, as further discussed below. The keyed entryway 602a of the insert 600a is different from the keyed entryway 602b of the insert 600b, such that a plug 700 intended for insert 600b will not work with insert 600a, and vice versa. In particular, the insert 600a is configured to work with DINSE-type plugs 700, while the insert 600b is configured to work with TWECO-type plugs 700. More particularly, each keyed entryway 602 comprises a hollow opening within the interior of the base 606, with a keyed surface that uniquely configures the opening for a particular type of plug 700.

Figure 6C:
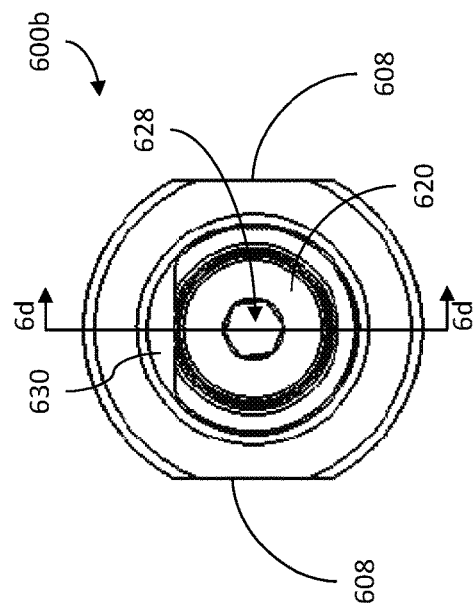
FIG. 6c is a front view of another example insert, in accordance with aspects of this disclosure.
Figure 6D:
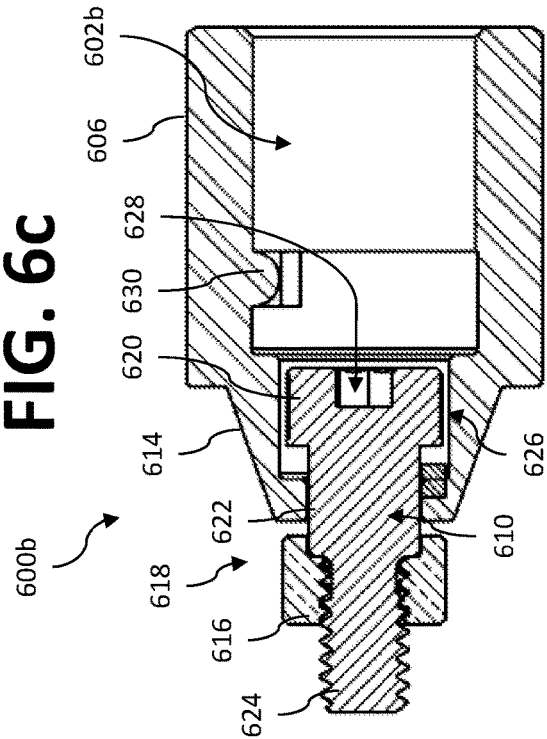
FIG. 6d is a cross-section of the example insert of FIG. 6c, along the line 6d-6d of FIG. 6c, in accordance with aspects of this disclosure.
Figure 6A:
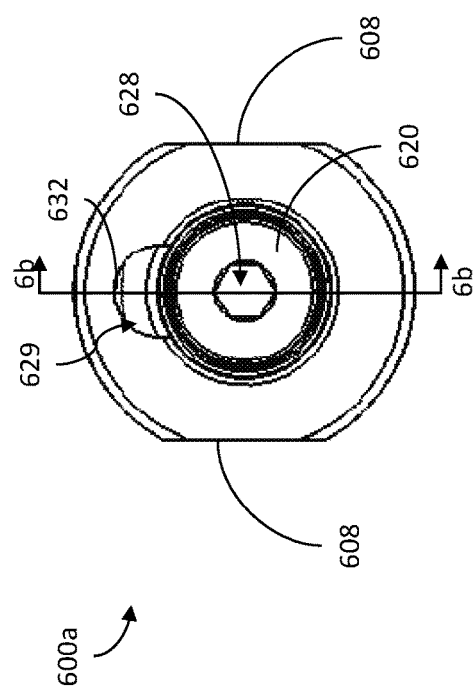
FIG. 6a is a front view of an example insert, in accordance with aspects of this disclosure.
Figure 6B:
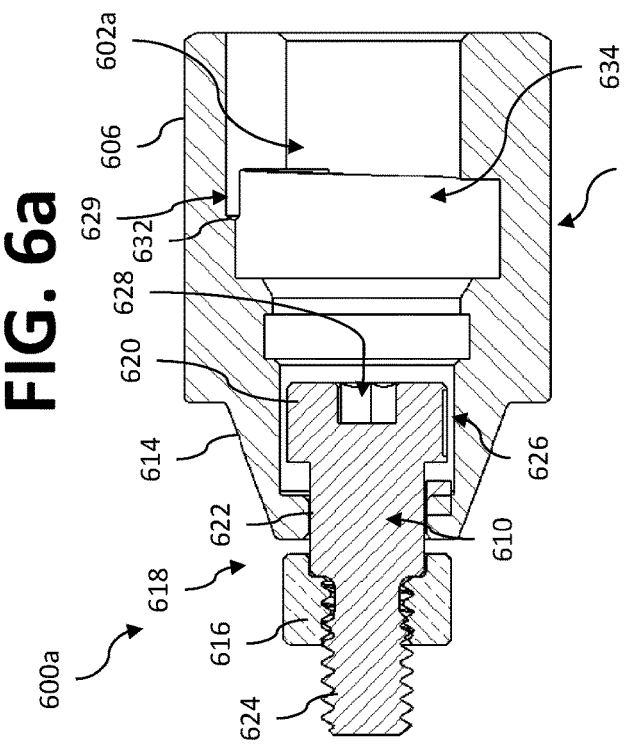
FIG. 6b is a cross-section of the example insert of FIG. 6a, along the line 6b-6b of FIG. 6a, in accordance with aspects of this disclosure.

As may be seen, for example, in FIGS. 3a, 6a, and 6b, the insert 600a includes a keyed entryway 602a. As shown, the keyed entryway 602a is shorter and less wide (with a smaller diameter) than the keyed entryway 602b in FIG. 6d. As shown, the keyed entryway 602a includes a groove 629 in the inner surface of the base 606. The groove 629 comprises the keyed surface of the keyed entryway 602a. The groove 629 expands the keyed entryway 602a within the base 606 along the axial length of the keyed entryway 602a. The groove 629 expands the keyed entryway 602a, so as to increase the diameter of the keyed entryway 602a along its axial length. As shown in FIGS. 6a and 6b, the groove 629 becomes slightly shallower at an inflection point 632. The keyed entryway 602 also includes a second groove 634 that expands the diameter of the keyed entryway in an arc around the keyed entryway at the inflection point 632. The second groove 634 provides space for a ridge 822 of a corresponding plug 700 to rotate within the keyed entryway 602a at the inflection point 632. Thus, the width of the second groove 634 may be approximately equal to (or slightly larger than) a width (and/or thickness) of the ridge 822. The configuration of the keyed entryway 602a comprises a DINSE-type (and/or style) configuration.

In operation, a DINSE-type plug 700 would have a key interface 802a comprising a cylindrical stem 820 with the ridge 822, such that the stem 820 could be inserted into the keyed entryway 602a when the ridge 822 is in alignment with the groove 629. Thereafter, the plug 700 (and/or stem 820) could be turned and/or twisted within the keyed entryway 602a to move the ridge 822 out of alignment with the groove 629, thereby securing the plug 700 within the keyed entryway 602a. When thus secured, the interior surface of the base 606 provides an electrical connection with the key interface 802a of the plug 700. The groove 629 prevents any non-DINSE plug 700 from connecting with the insert 600a.

As may be seen, for example, in FIGS. 6c and 6d, the insert 600b includes a keyed entryway 602b with a keyed surface comprising a latch 630 that protrudes into the keyed entryway 602b. As shown, the latch 630 is a protuberance that extends from an inner surface of the base 606 of the insert 600b into the opening of the keyed entryway 602b. In the examples of FIGS. 6c and 6d, the latch 630 lessens the diameter of the keyed entryway 602b within the base 606. Notably, the keyed entryway 602 has an approximately consistent diameter most everywhere else within the body 604 of the insert 600b. The latch 630 is positioned closer to the nose 614 of the insert 600b than the beginning of the keyed entryway 602b. The configuration of the keyed entryway 602b comprises a TWECO-type (and/or style) configuration.

In operation, a TWECO-type plug 700 would have a key interface 802b comprising a cylindrical stem 820 with a cutout 823 that matched the latch 630, such that the stem 820 could be inserted into the keyed entryway 602b at an orientation where the cutout 823 aligned with the latch 630, so that the stem 820 could pass by the latch 630. Thereafter, the plug 700 (and/or stem 820) could be turned and/or twisted within the keyed entryway 602b to move the cutout 823 out of alignment with the latch 630, thereby securing the plug 700 within the keyed entryway 602b. When thus secured, the interior surface of the base 606 provides an electrical connection with the key interface 802b of the plug 700. The latch 630 prevents any non-TWECO-plug 700 from connecting with the insert 600b.

As may be seen, for example, in FIGS. 6e and 6f, the insert 600c includes a keyed entryway 602c with a keyed surface comprising a pair of opposing grooves. Each of the grooves 652 has an inflection point 654, similar to the groove 629 and inflection point 632 of the insert 600a. The keyed entryway 602c (and/or keyed surface) further includes threaded grooves 650 to assist with turning of a complementary plug adapter 800c. In operation, shoulders 827 of a complementary plug adapter 800c may move within the grooves 652, until encountering the inflection points 654, at which point the plug adapter 800c may be turned to take the shoulders 827 out of alignment with the grooves 652. In some examples, one or more of the inflection points 654 may be omitted from the insert 600c.

In some examples, the plug adapter 800c may have a key interface 802 similar to the stem portion described in U.S. Pat. No. 7,377,825, which is owned by the assignee of the present application, and hereby incorporated by reference. In some examples, the insert 600c may have a base 606 similar to portions of the receptacle U.S. Pat. No. 7,377,825.

Figure 7A:
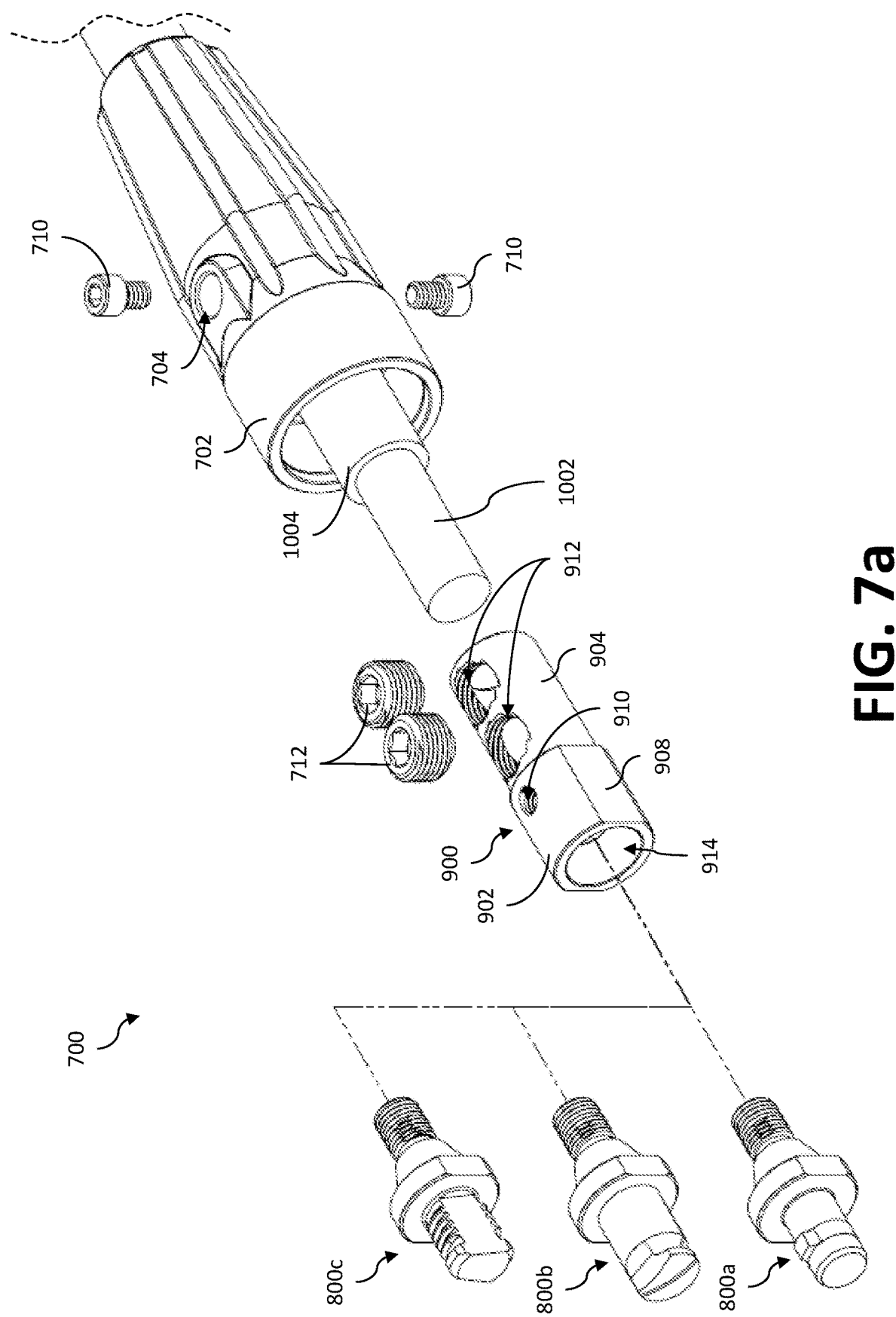
FIG. 7a is a perspective exploded view of an example plug assembly, in accordance with aspects of this disclosure.
Figure 7B:
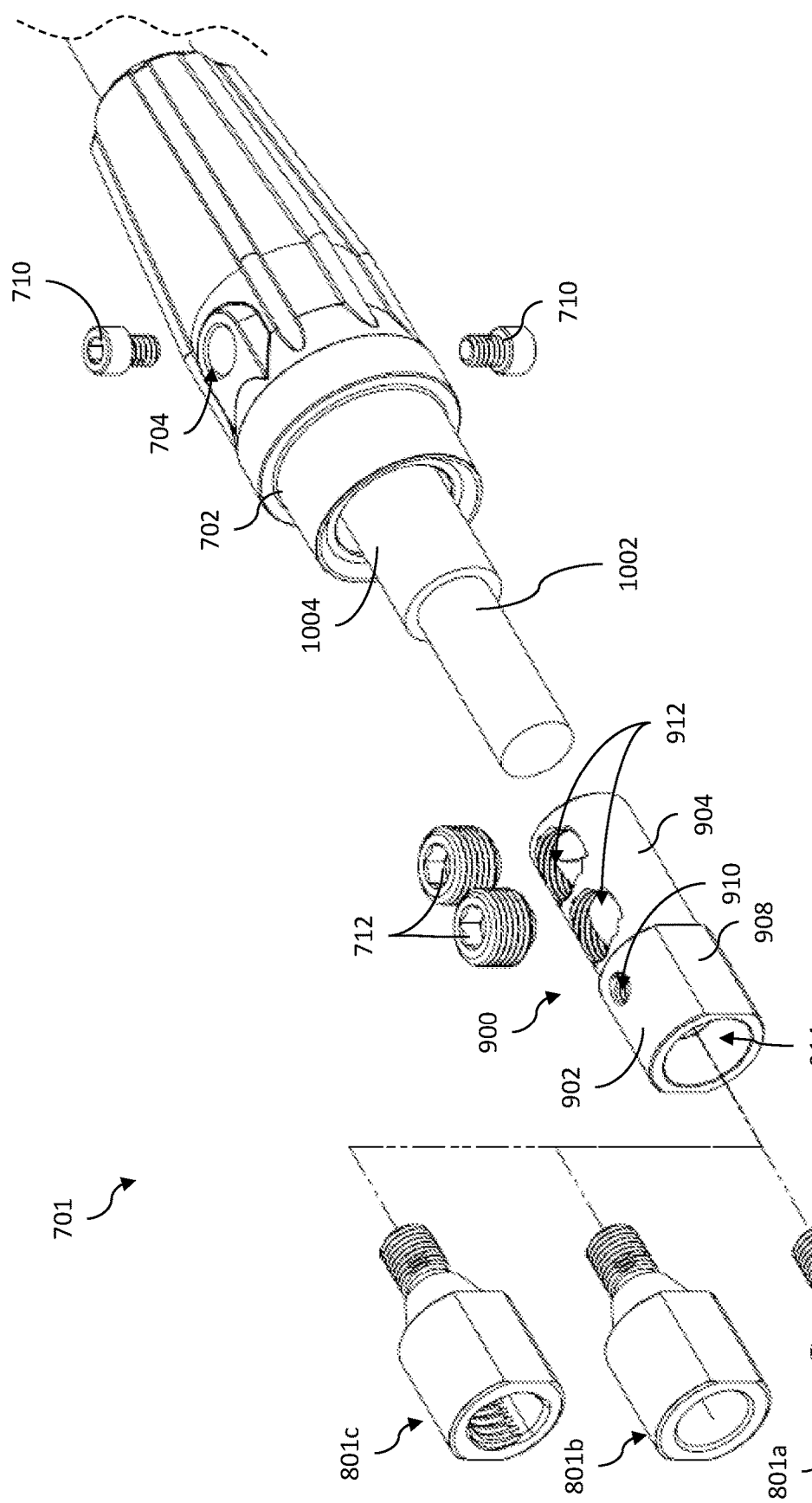
FIG. 7b is a perspective exploded view of another example plug assembly, in accordance with aspects of this disclosure.
Figure 10C:
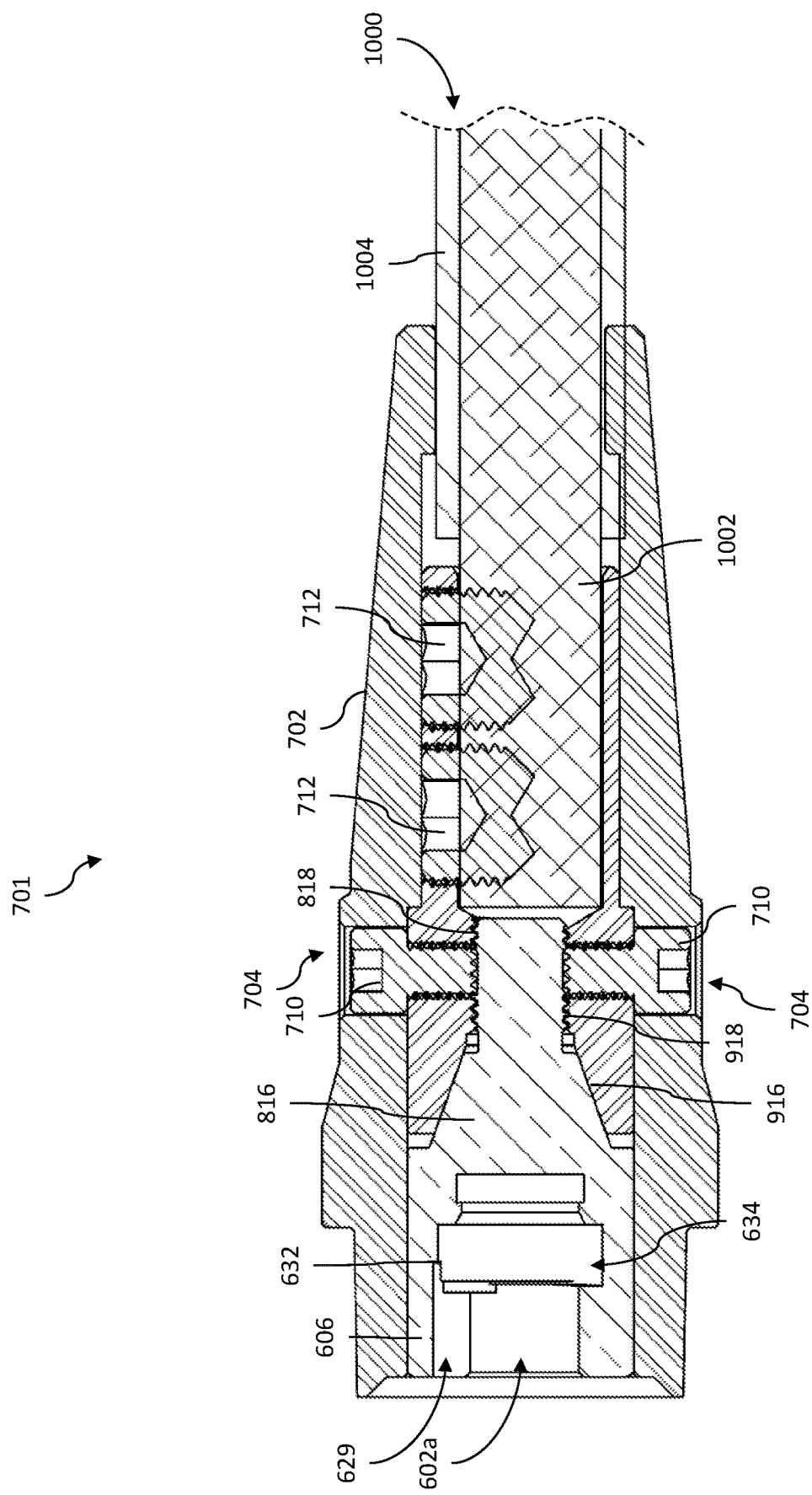
FIG. 10*c* is a cross section of the plug assembly of FIG. 7*b*, with one of the plug adapters of FIG. 7*b*, in accordance with aspects of this disclosure.

FIGS. 7a and 7b show examples of welding-type power plug assemblies 700, 701. The plug assembly 700 in FIG. 7a may be considered a "male" plug assembly 700, while the plug assembly 701 in FIG. 7b may be considered a "female" plug assembly 701. As shown, the plug assembly 700 includes a plug adapter 800, a plug receptacle 900, and a plug cover 702. The plug assembly 701 includes a plug adapter 801, a plug receptacle 900, and a plug cover 702. The plug adapters 800, 801 and plug receptacle 900 may be comprised of electrically conductive material, such as brass and/or copper, for example. The plug cover 702 may be comprised of an electrically and/or thermally insulating material (e.g., rubber), so as to allow an operator to grasp the plug assembly 700 during operation. In the examples of FIGS. 10b and 10c, the plug cover 702 encloses the plug receptacle 900 and much of the plug adapter 800, 801 when the plug assembly 700 is assembled together. In some examples (e.g., FIG. 10b), portions of the plug adapter 800, 801 may extend beyond the plug cover 702 when the plug assembly 700, 701 is assembled. In some examples (e.g., FIG. 10c), the plug cover 702 may encircle the entirety of the plug adapter 800, 801 when the plug assembly 700, 701 is assembled.

FIGS. 7a, 7b, 9a, and 9b show an example receptacle 900. As shown, the receptacle 900 includes an outer surface and an inner surface. The outer surface includes a base 902 and a tube 904. In the examples of FIGS. 7, 9a, and 9b, both the base 902 and tube 904 are approximately cylindrical. As shown, the base 902 has opposing wrench flats 908 that truncate the cylindrical shape of the base. The base 902 includes cap screw holes 910 on opposing sides of the base 902. The tube 904 includes axially aligned set screw holes 912. The surfaces encircling the set screw holes 912 and/or cap screw holes 910 may be formed with threaded grooves to engage the screws.

The inner surface of the receptacle 900 encircles a conduit 914 that extends through the receptacle 900. The inner surface includes an adapter interface 916, a tail interface 918 and a cable interface 920. As shown, the diameter of the conduit 914 is largest at the beginning of the adapter interface 916, then narrows to a smaller diameter within the tail interface 918, before expanding again within the cable interface 920. The adapter interface 916 is shaped approximately conically (and/or frustoconically) and is configured to contact, connect, and/or interface with the receptacle interface 806 of the plug adapter 800, so as to establish an electrical connection between the plug adapter 800 and the receptacle 900. The diameter of the conduit 914 at the widest point within the adapter interface 916 is smaller than the diameter of a central disc 804 of the plug adapter 800 (and/or body 604 of the plug adapter 801), such that the central disc 804 will not fit within the conduit 914.

In the example of FIGS. 7a, 7b, and 9b, the plug receptacle 900 includes opposing cap screw holes 910 in the outer surface that lead to the tail interface 918. As shown, the tail interface 918 is approximately cylindrical. In some examples, the tail interface 918 may be formed with engagement features, such as threaded grooves, for example, to engage complementary engagement features on the tail 818. When the plug assembly 700, 701 is assembled together, the cap screw holes 910 may align with complementarily shaped and/or sized cap screw holes 704 in the plug cover 702 to receive cap screws 710, such as nylon cap screws, for example. In some examples, the cap screws 710 may be formed of some other electrically and/or thermally insulating material. The surface of the receptacle 900 surrounding the cap screw holes 910 may include threaded grooves to receive the cap screws 710. In operation, the cap screws 710 may assist in frictionally retaining the tail 818 within the conduit 914 encircled by the tail interface 918.

In the examples of FIGS. 7a, 7b, and 9b, the plug receptacle 900 further includes set screw holes 912 that lead to the cable interface 920. As shown, the cable interface 920 is approximately cylindrical. The set screw holes 912 may be encircled by threaded grooves, to receive set screws 712. The set screws 712 may be formed of electrically conductive material, such as a metallic material, for example. When the plug assembly 700 is assembled together with a welding cable 1000, exposed wiring 1002 of the welding cable 1000 (that has been stripped of insulation 1004) may be held against the cable interface 920 by set screws 712 within the set screw holes 912 to provide an electrical connection between the welding cable 1000 and the plug receptacle 900.

In the examples of FIGS. 7a and 7b, several different plug adapters 800, 801 are shown. In FIG. 7a, plug adapters 800a-800c include "male" style key interfaces 802. In FIG. 7b, the plug adapters 801a-801c include "female" style key entryways 602, similar to the key entryways 602 of the socket inserts 600. FIG. 10b shows an example assembled plug assembly 700 with the plug adapter 800a. FIG. 10c shows an example assembled plug assembly 701 with the plug adapter 801a. It should be understood that any of the plug adapters 800, 801 could be interchanged with the plug adapters 800a, 801a in FIGS. 10b and 10c, and/or otherwise used with the socket assembly 700.

In the examples of FIGS. 7a and 8a-8i, the plug adapters 800 include a central disc 804 having wrench flats 808 that may be used by a wrench (and/or other appropriate tool) to connect and/or disconnect the plug adapter 800 to/from the plug receptacle 900. The plug adapter 800 further includes a key interface 802, a receptacle interface 806, and a tail 818. The key interface 802 and receptacle interface 806 extend from opposite faces of the central disc 804. In the examples of FIG. 7, the receptacle interface 806 is a conical (and/or frustoconical) surface. The receptacle interface 806 is configured to electrically contact, connect to, and/or interface with a complementary surface in the plug receptacle 900, so as to establish an electrical connection with the plug receptacle 900, through which electrical power may flow.

In the examples of FIGS. 7a and 8a-8i, the receptacle interface 806 and the tail 818 connect at an end opposite of the key interface 802. As shown, the tail 818 is approximately cylindrical, with an outer diameter slightly less than the stem 820 of the key interface 802. The tail 818 may be formed with engagement features, such as screw threads, for example. The tail 818 may be configured to engage with the tail interface 918 of the receptacle 900, such as through complementary engagement features (e.g., threaded grooves) of the tail interface 918. Thus, the tail 818 and tail interface 918 (with or without with cap screws 710) may allow an operator to securely connect the plug adapter 800 to, and disconnect the plug adapter from, the receptacle 900, as desired.

Figure 8A:
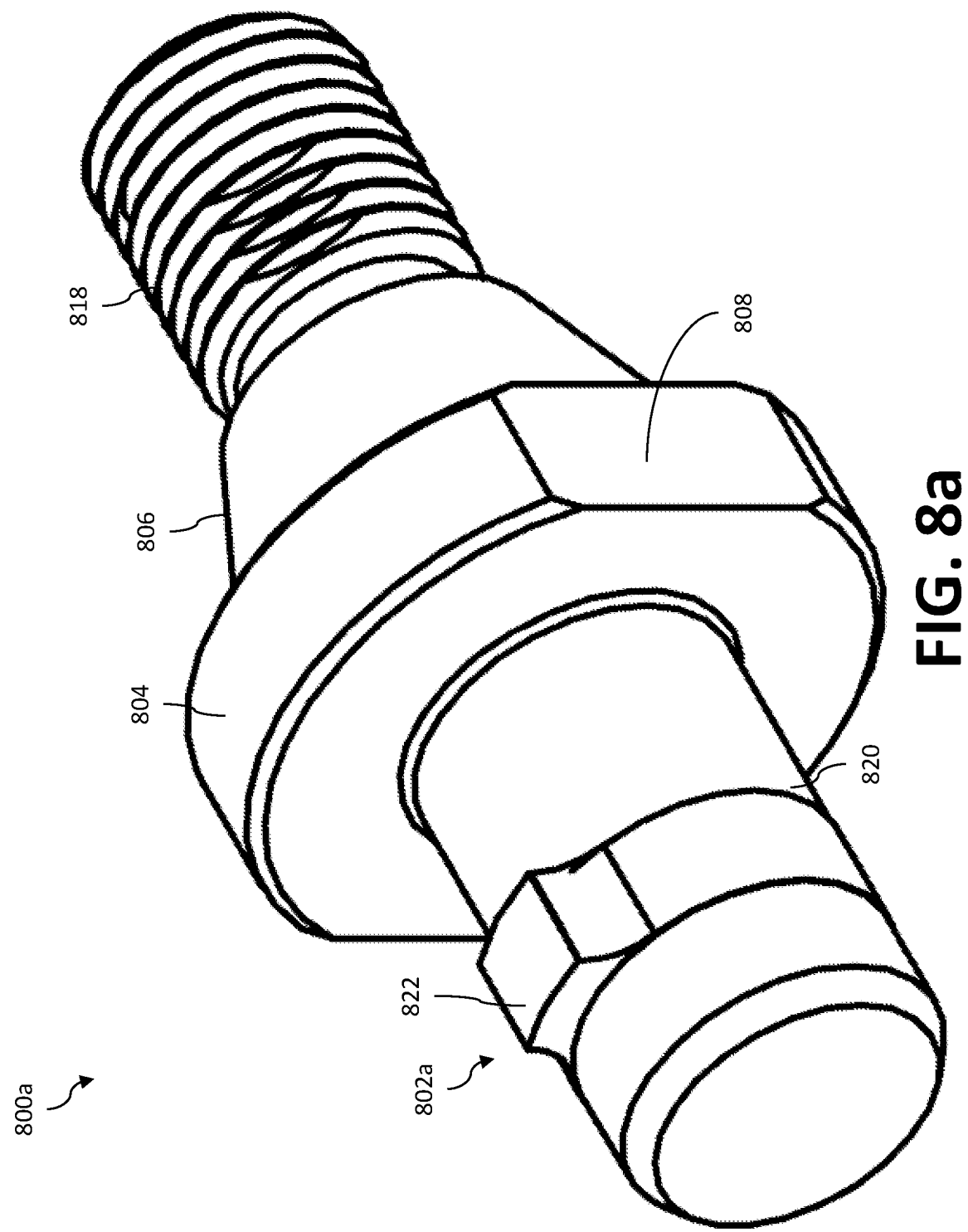
FIG. 8a is a perspective view of an example plug adapter, in accordance with aspects of this disclosure.

In the example of FIGS. 8a-8c, the key interface 802a of the plug adapter 802a comprises a cylindrical stem 820 with a key interface feature. As shown, the key interface feature comprises a ridge 822 that protrudes radially away from the body. As shown, the ridge 822 is sized, shaped, and/or otherwise configured to fit through the groove 629 of the keyed entryway 602a. Thus, the plug assembly 700 may be connected with the socket 300 by inserting the key interface 802 into the keyed entryway 602a of the insert 600, whereby the ridge 822 will move through the groove 629 until the ridge 822 hits the inflection point 632. Thereafter, the plug assembly 700 may be turned and/or twisted to move the ridge 822 through the second groove 634, to a point where the ridge 822 is out of alignment with the groove 632a. Once the ridge 822 is out of alignment with the groove 632a, the plug assembly 700 may not be removed from the socket 300 without moving the ridge 822 back into alignment.

Figure 8D:
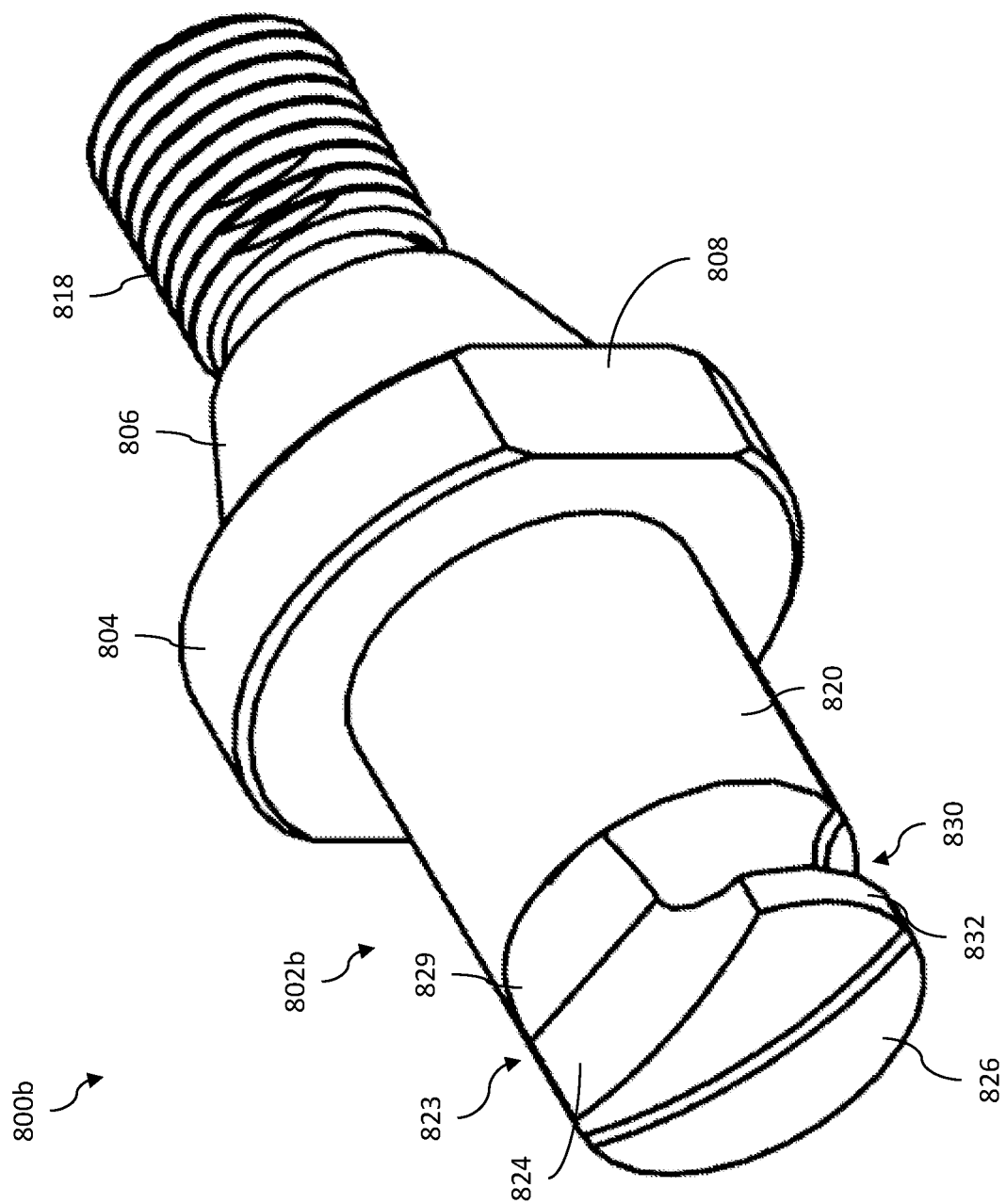
FIG. 8d is a perspective view of another example plug adapter, in accordance with aspects of this disclosure.
Figure 8E:
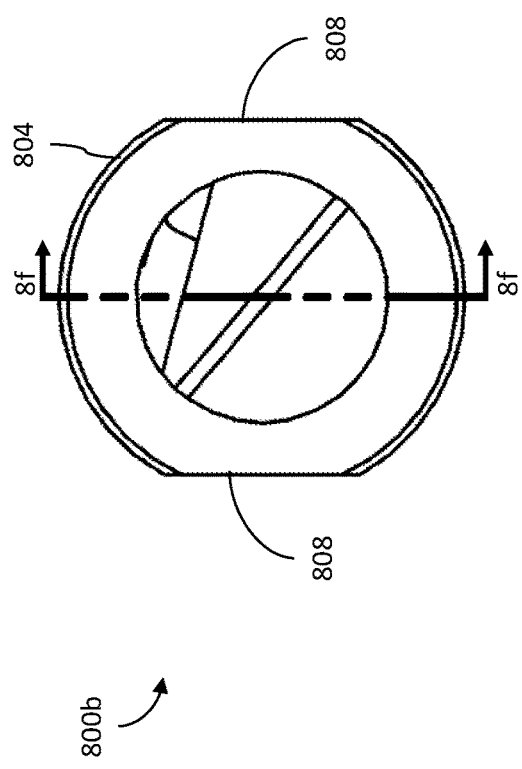
FIG. 8e is a front view of the example plug adapter of FIG. 8d, in accordance with aspects of this disclosure.
Figure 8F:
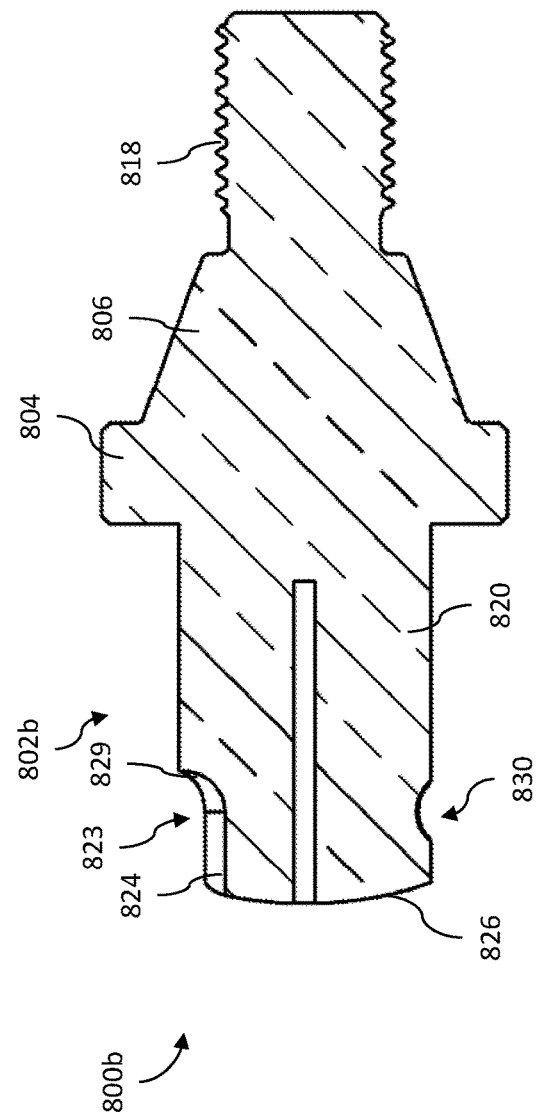
FIG. 8f is a cross-section of the example plug adapter of FIG. 8e, along the line 8f-8f of FIG. 8e, in accordance with aspects of this disclosure.

FIGS. 8d-8i show example plug adapters 800b and 800c with different key interface features. In the example of FIGS. 8d-8f, the plug adapter 800b includes a key interface 802b with a key interface feature comprising a cutout 823 in the stem 820 of the key interface 802. The cutout 823 results in a flat surface 824 that extends from an end 826 of the key interface 802b to a semicircular wall 829. The cutout 823 further forms an annular channel 830 that circles part of the flat surface 826, forming a hook 832. In operation, the cutout 823 is configured to allow the key interface 802 to proceed past the latch 630 in the keyed entryway 602b. The annular channel 830 provides a path for the latch 630 when the key interface 802 rotates within the keyed entryway 602. After rotation, the cutout 823 will be out of alignment with the latch 630, and the hook 832 will grasp the latch 630, so that the key interface 802 may not be withdrawn from the keyed entryway 602.

Figure 8G:
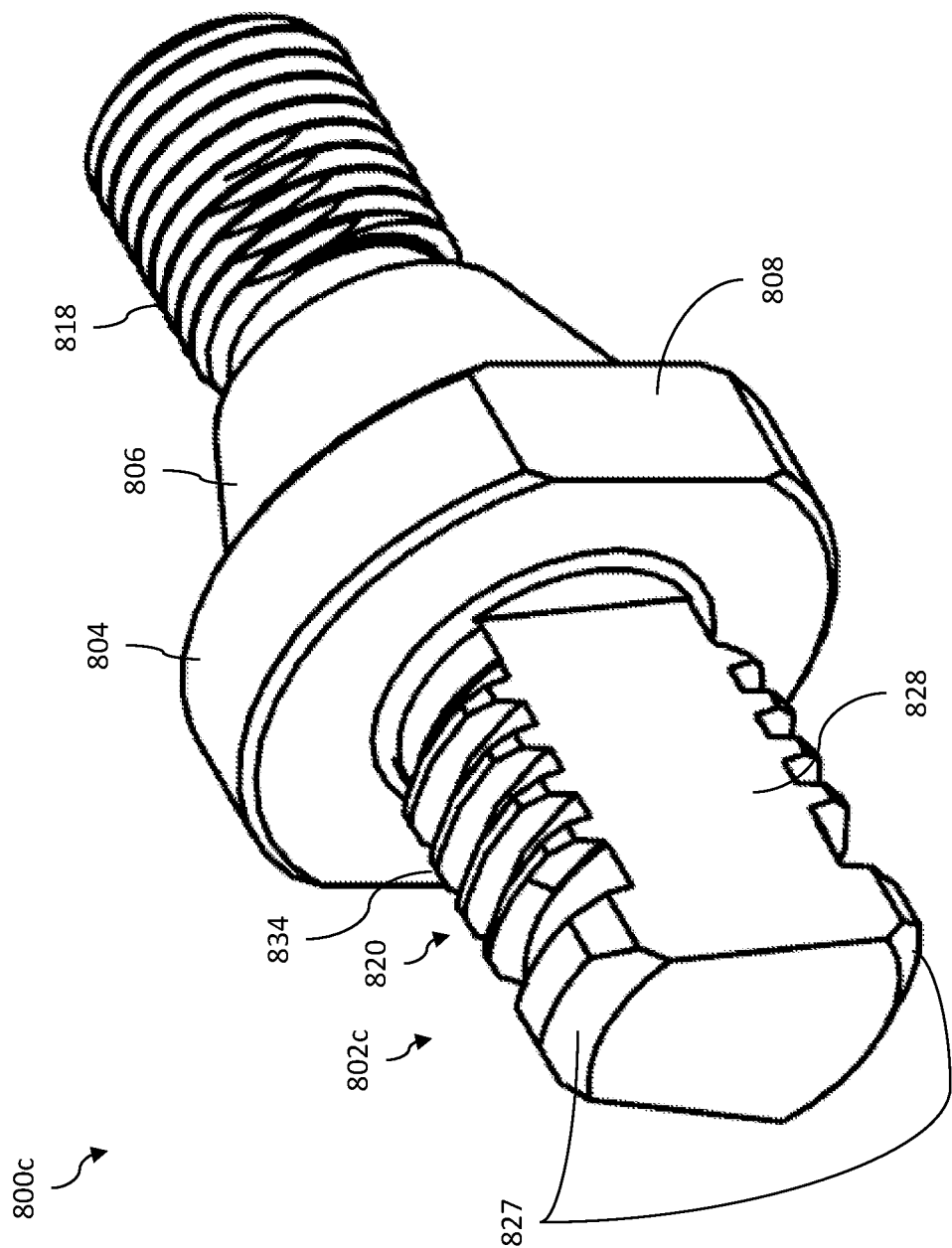
FIG. 8g is a perspective view of another example plug adapter, in accordance with aspects of this disclosure.
Figure 8J:
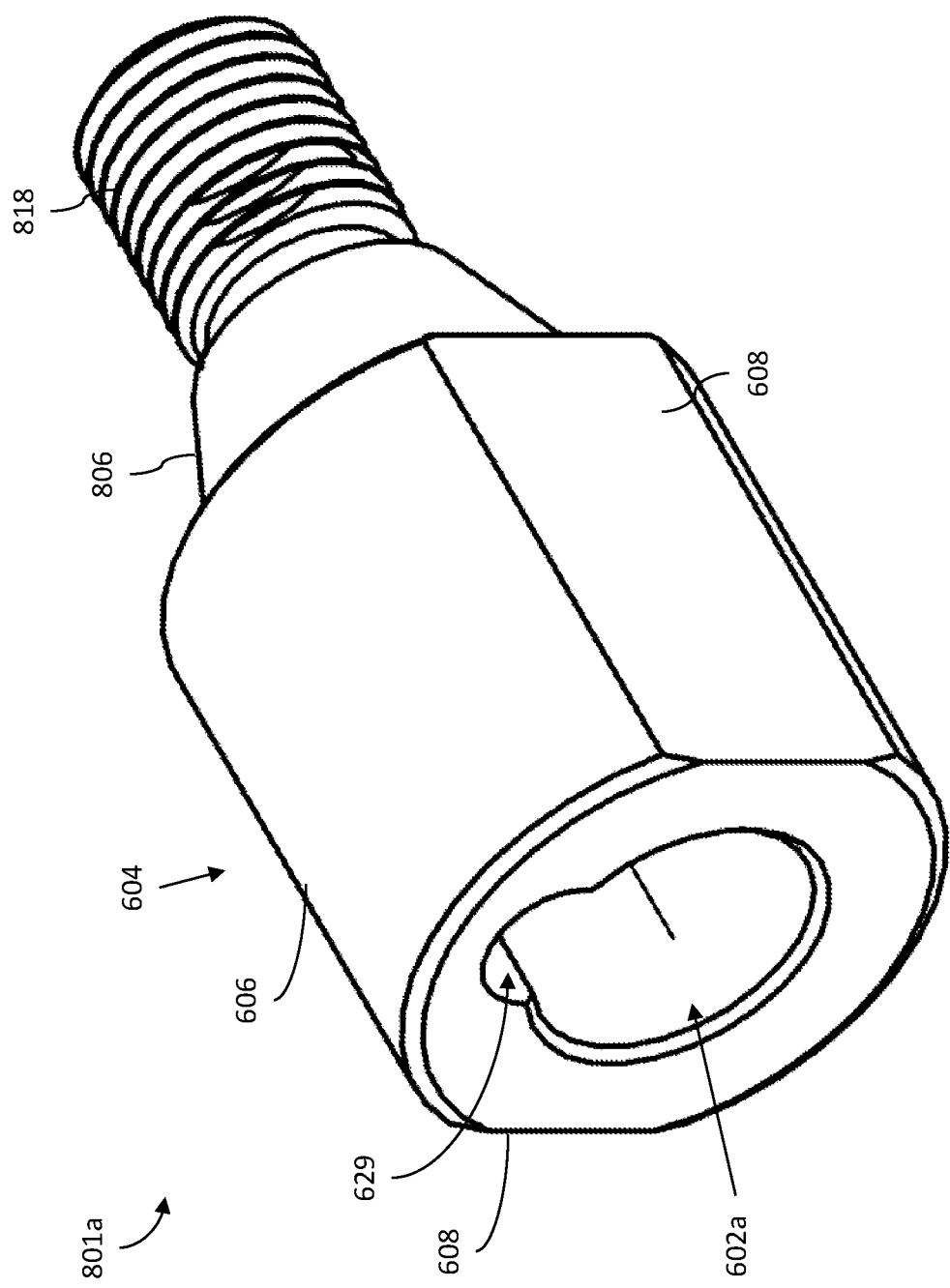
FIG. 8j is a perspective view of another example plug adapter, in accordance with aspects of this disclosure.
Figure 8K:
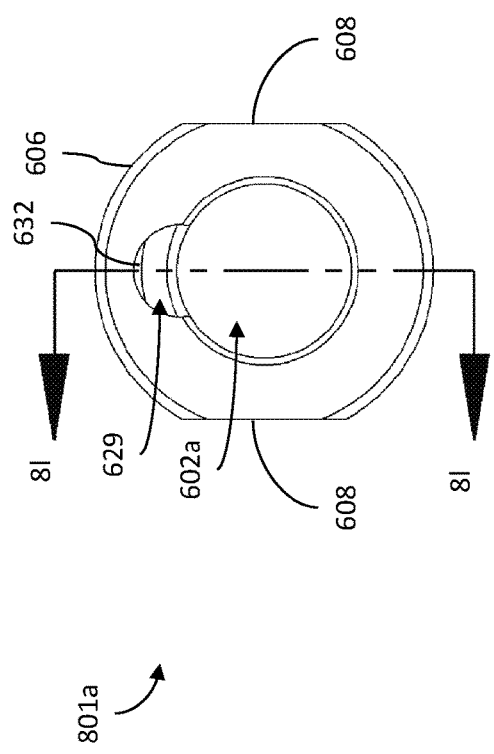
FIG. 8k is a front view of the example plug adapter of FIG. 8j, in accordance with aspects of this disclosure.
Figure 8L:
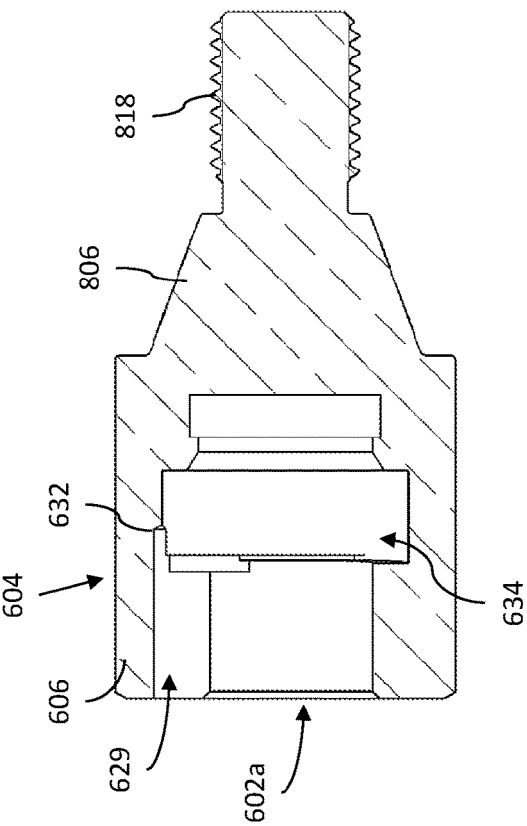
FIG. 8l is a cross-section of the example plug adapter of FIG. 8k, along the line 8l-8l of FIG. 8k, in accordance with aspects of this disclosure.
Figure 8M:
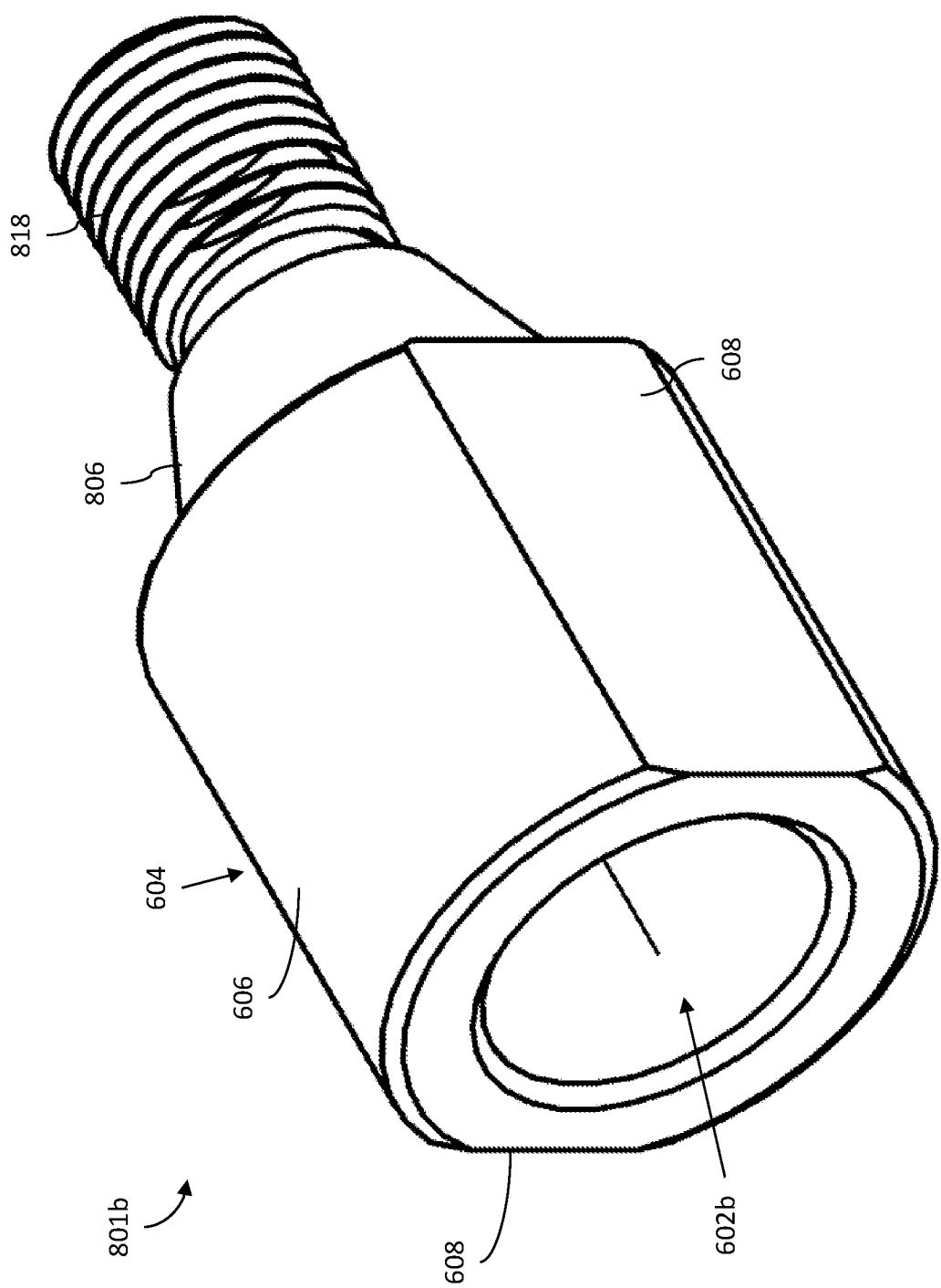
FIG. 8m is a perspective view of another example plug adapter, in accordance with aspects of this disclosure.
Figure 8N:
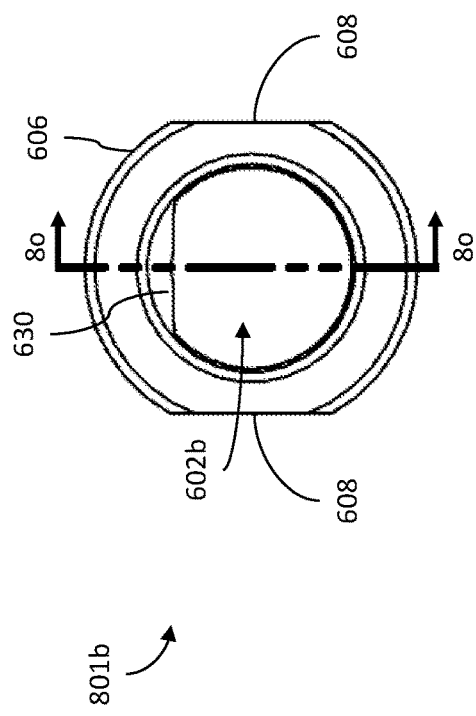
FIG. 8n is a front view of the example plug adapter of FIG. 8m, in accordance with aspects of this disclosure.
Figure 8O:
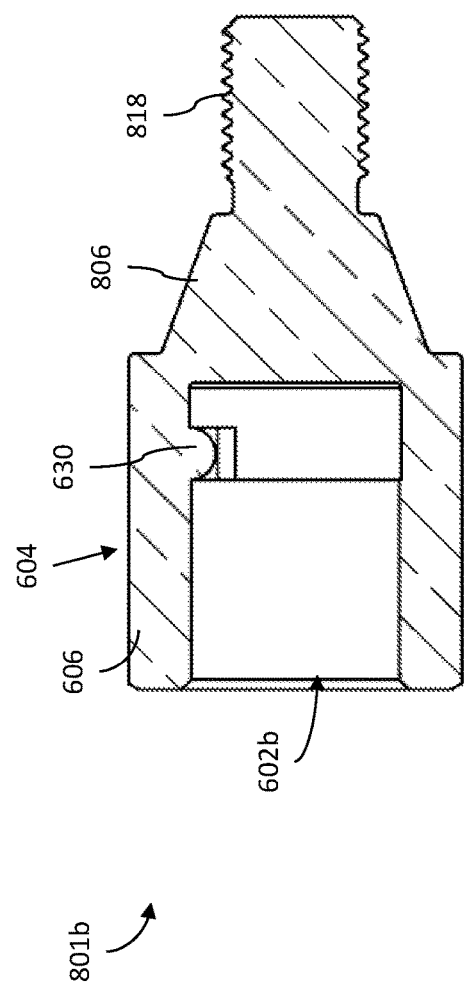
FIG. 8*o* is a cross-section of the example plug adapter of FIG. 8*n*, along the line 8*o*-8*o* of FIG. 8*n*, in accordance with aspects of this disclosure.
Figure 8P:
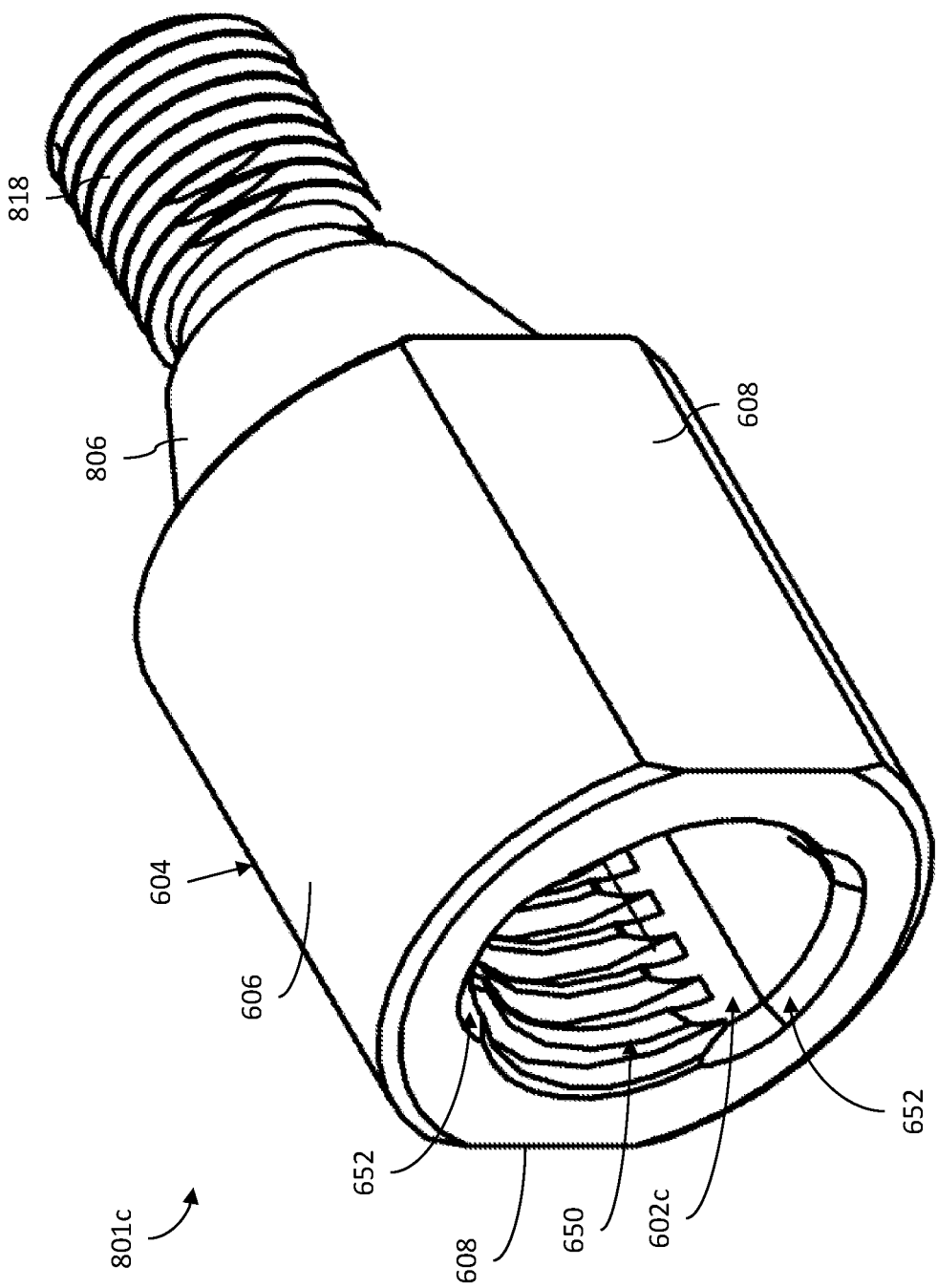
FIG. 8*p* is a perspective view of another example plug adapter, in accordance with aspects of this disclosure.

In the example of FIGS. 8g-8i, the plug adapter 800c includes a key interface 802c with a stem 820 that is not completely cylindrical. Rather, the stem 820 includes flat sides 828 that truncate the otherwise cylindrical stem 820. The cylindrical portions of the stem 820 are formed with screw threads 834. Extending from the stem 820 is a key interface feature comprising a pair of opposing shoulders 827 formed on opposite sides of the cylindrical portions of the stem 820. The shoulders 827 are configured to pass through a pair of opposing grooves 652 in a keyed entryway 602c of the insert 600c (and/or plug adapter 801c). In some examples, the plug adapter 800 may have a key interface 802 similar to the stem portion described in U.S. Pat. No. 7,377,825, which is owned by the assignee of the present application, and hereby incorporated by reference.

FIGS. 7b and 8j-8r show plug adapters 801 that have a "female" keyed entryway 602, similar to the keyed entryways 602 of the socket inserts 600. The plug adapters 801 share features with both the socket inserts 600 and the plug adapters 800. In the examples of FIGS. 7b, 8j-8r, and 10c, the plug adapters 801 still have the tail 818 and receptacle interface 806 (and/or nose 614), but no central disc 804 or key interface 802. Instead, the plug adapter 800 has a body 604 comprising of a base 606 with a keyed entryway 602, similar to that of the inserts 600. As all of these features were previously described, they will not be enumerated again here.

Figure 11:
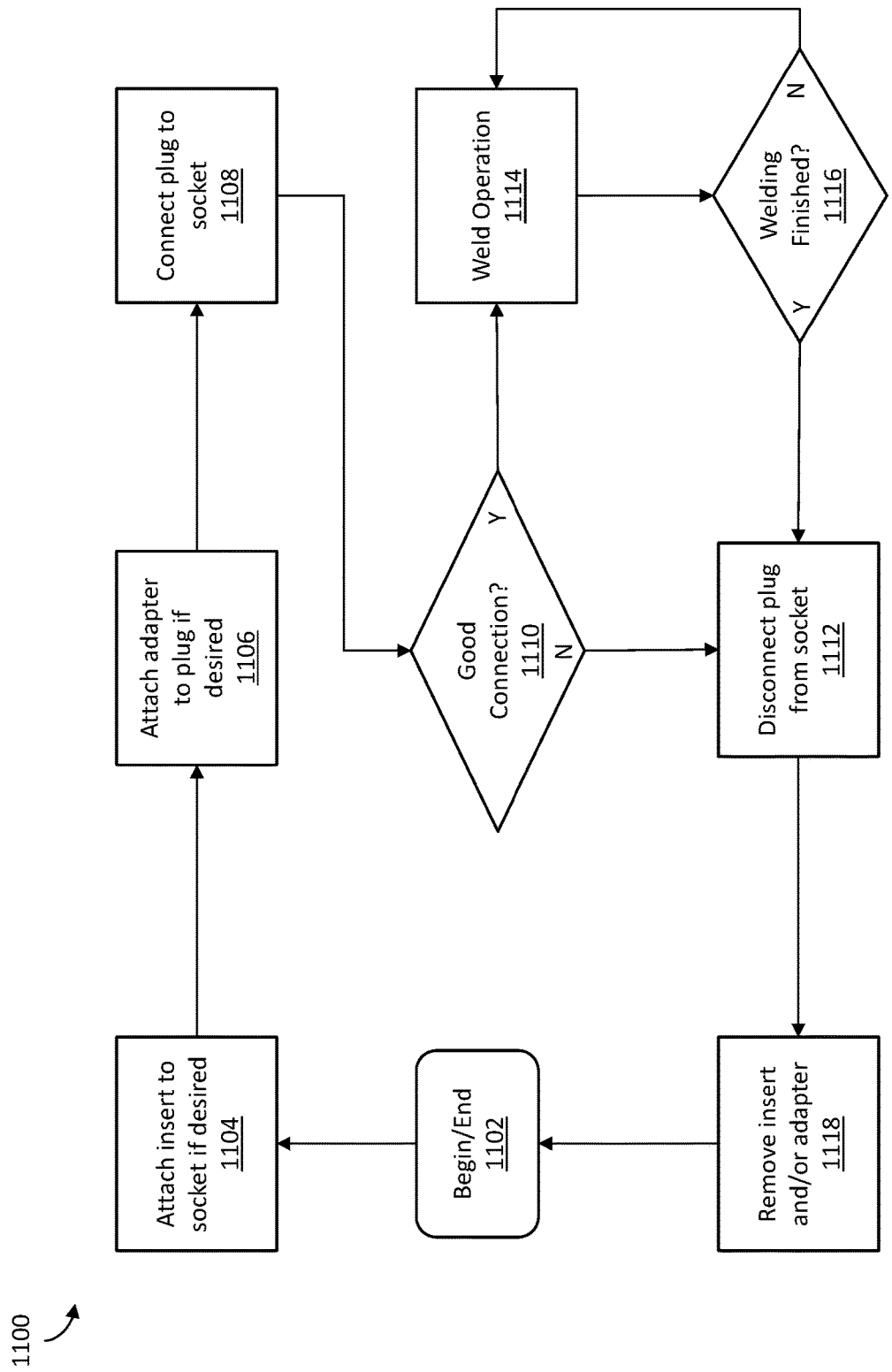
FIG. 11 is a flow diagram illustrating an example method of operation, in accordance with aspects of this disclosure.

FIG. 11 shows an example method 1100 for configuring and/or reconfiguring a welding-type power socket 300 and/or plug assembly 700 for welding-type operation. While the disclosure refers to an operator, it should be understood that, in some examples, an automated machine, such as a robot for example, may take the role of an operator. The method 1100 begins at block 1102, assuming that the plug assembly 700 is disconnected from the power socket 300, and the one or more socket connectors 500 are firmly attached within the bulkheads 400 of the electrical panel 102 of the welding-type power supply 12. At block 1104, the operator may attach one of the inserts 600 to the socket connector 500, if desired, such as by securely coupling the coupler 618 of the insert 600 to the coupling surface 518 of the socket connector 500. At block 1106, the operator may attach one of the plug adapters 800, 801 to the plug receptacle 900, such as by connecting the tail 818 of the plug adapter 800 to the tail interface 918 of the plug receptacle 900, and further tightening the cap screws 710. Presumably the operator will attach an insert 600 with a keyed entryway 602 that corresponds to the key interface 802 of the plug adapter 800 being attached to the plug receptacle 900. In some examples, blocks 1104 and/or 1106 may be skipped if the correct and/or desired socket insert(s) 600 and/or plug adapter(s) 800 are already attached. At block 1108, the plug assembly 700 is connected to the power socket 300 by inserting the key interface 802 into the keyed entryway 602 and twisting and/or turning the plug assembly, so as to move the key interface 802 into a locking arrangement with the keyed entryway 602, with the key interface feature out of alignment with the keyed surface.

At block 1110 the operator may determine whether a good connection has been made. If not, the method 1100 proceeds to block 1112, discussed further below. If so, the method proceeds to block 1114, where a welding operation may take place, using the welding-type power flowing from the welding-type power supply 12, through the connection between the welding-type power socket 300 and the plug assembly 700 and to the appropriate welding component. In some examples, the welding cable 1000 may lead to another plug assembly 700 having a "female" plug adapter 800, which may in turn be attached to another plug assembly 700 having a "male" plug adapter 800, and so on in a daisy chain and/or extension fashion until the welding cable 1000 terminates in a welding component.

At block 1116, the operator may determine whether the welding type operation is finished. If not, block 1114 continues and/or repeats. If so, the method 1100 proceeds to block 1112, where the operator may disconnect the plug assembly 700 from the power socket 300. In some examples, this block may be skipped if further welding-type operations are planned for the near future. The method 1100 then proceeds to block 1118, where the operator may remove the insert 600 and/or plug adapter 800 from the power socket 300 and/or plug assembly 700, if so desired. In some examples, this block 1118 may be skipped if, for example, further welding-type operations are planned in the near future using the currently attached insert 600 and/or plug adapter 800. The method once again ends/begins at block 1102.

While the present apparatuses, systems, and/or methods have been described with reference to certain implementations, it will be understood by those skilled in the art that various changes may be made and equivalents may be substituted without departing from the scope of the present apparatuses, systems, and/or methods. In addition, many modifications may be made to adapt a particular situation or material to the teachings of the present disclosure without departing from its scope. Therefore, it is intended that the present apparatuses, systems, and/or methods not be limited to the particular implementations disclosed, but that the present apparatuses, systems, and/or methods will include all implementations falling within the scope of the appended claims.

What is claimed is:

1. A removable insert for a socket of a welding power supply, comprising:
    a base having a keyed entryway configured to connect with a key interface of a plug, the keyed entryway comprising a bore encircled by an inner surface of the base, the inner surface having a fixed keyed surface comprising a TWECO style latch that protrudes into the bore or a DINSE style axial groove that expands the bore;
    a nose comprising a contact surface configured to make electrical contact with a complementary contact surface of a socket connector of the welding power supply, thereby enabling conduction of electricity from the welding power supply to the plug, the contact surface comprising a frustoconical surface having a first frustoconical end with a first outer diameter and a second frustoconical end with a second outer diameter, the first outer diameter being larger than the second outer diameter, and the first frustoconical end abutting the base; and
    a coupler configured to couple the removable insert to the socket connector, thereby ensuring good electrical contact and connection with the socket connector of the welding power supply.

2. The removable insert of claim 1, wherein the bore of the keyed entryway leads to the coupler, the coupler comprising a shoulder screw.

3. The removable insert of claim 2, wherein the bore of the keyed entryway leads to a recess in the nose, at least a portion of the coupler being retained in the recess.

4. The removable insert of claim 1, wherein the coupler comprises a shoulder screw, the shoulder screw having a head at a first end of the shoulder screw, a screw thread at a second end that is opposite the first end, and a shank connecting the head to the screw thread.

5. The removable insert of claim 4, wherein the screw thread of the coupler is configured to engage complementary threaded grooves of the socket connector.

6. The removable insert of claim 5, wherein the head of the shoulder screw is entirely positioned within a recess of the nose, the head having a tool interface configured for coupling to a tool.

7. The removable insert of claim 5, wherein the coupler further comprises a nut screwed to the screw thread, the nut having an outer diameter no greater than a smallest outer diameter of the nose.

8. A removable insert for a socket of a welding power supply, comprising:
   a base having a keyed entryway configured to connect with a key interface of a plug, the keyed entryway comprising a bore encircled by an inner surface of the base, the inner surface having a fixed keyed surface comprising a TWECO style latch that protrudes into the bore;
   a nose comprising a contact surface configured to make electrical contact with a complementary contact surface of a socket connector of the welding power supply, thereby enabling conduction of electricity from the welding power supply to the plug, the contact surface comprising a frustoconical surface having a first frustoconical end with a first outer diameter and a second frustoconical end with a second outer diameter, the first outer diameter being larger than the second outer diameter, and the first frustoconical end abutting the base; and
   a coupler configured to couple the removable insert to the socket connector, thereby ensuring good electrical contact and connection with the socket connector of the welding power supply.

9. The removable insert of claim 8, wherein the bore of the keyed entryway leads to the coupler, the coupler comprising a shoulder screw.

10. The removable insert of claim 9, wherein the bore of the keyed entryway leads to a recess in the nose, at least a portion of the coupler being retained in the recess.

11. The removable insert of claim 8, wherein the coupler comprises a shoulder screw, the shoulder screw having a head at a first end of the shoulder screw, a screw thread at a second end that is opposite the first end, and a shank connecting the head to the screw thread.

12. The removable insert of claim 11, wherein the screw thread of the coupler is configured to engage complementary threaded grooves of the socket connector.

13. The removable insert of claim 12, wherein the head of the shoulder screw is entirely positioned within a recess of the nose, the head having a tool interface configured for coupling to a tool.

14. The removable insert of claim 12, wherein the coupler further comprises a nut screwed to the screw thread, the nut having an outer diameter no greater than a smallest outer diameter of the nose.

15. A removable insert for a socket of a welding power supply, comprising:
   a base having a keyed entryway configured to connect with a key interface of a plug, the keyed entryway comprising a bore encircled by an inner surface of the base, the inner surface having a fixed keyed surface comprising a DINSE style axial groove that expands the bore;
   a nose comprising a contact surface configured to make electrical contact with a complementary contact surface of a socket connector of the welding power supply, thereby enabling conduction of electricity from the welding power supply to the plug, the contact surface comprising a frustoconical surface having a first frustoconical end with a first outer diameter and a second frustoconical end with a second outer diameter, the first outer diameter being larger than the second outer diameter, and the first frustoconical end abutting the base; and
   a coupler configured to couple the removable insert to the socket connector, thereby ensuring good electrical contact and connection with the socket connector of the welding power supply.

16. The removable insert of claim 15, wherein the bore of the keyed entryway leads to the coupler, the coupler comprising a shoulder screw.

17. The removable insert of claim 16, wherein the bore of the keyed entryway leads to a recess in the nose, at least a portion of the coupler being retained in the recess.

18. The removable insert of claim 15, wherein the coupler comprises a shoulder screw, the shoulder screw having a head at a first end of the shoulder screw, a screw thread at a second end that is opposite the first end, and a shank connecting the head to the screw thread.

19. The removable insert of claim 18, wherein the screw thread of the coupler is configured to engage complementary threaded grooves of the socket connector, and the coupler further comprising a nut screwed to the screw thread, the nut having an outer diameter no greater than a smallest outer diameter of the nose.

20. The removable insert of claim 19, wherein the head of the shoulder screw is entirely positioned within a recess of the nose, the head having a tool interface configured for coupling to a tool.

* * * * *